US011203653B2

(12) United States Patent
Borse et al.

(10) Patent No.: US 11,203,653 B2
(45) Date of Patent: Dec. 21, 2021

(54) BIMODAL POLYETHYLENE

(71) Applicant: Univation Technologies, LLC, Houston, TX (US)

(72) Inventors: Nitin Borse, Lake Jackson, TX (US); Ayush A. Bafna, Manvel, TX (US); Cliff R. Mure, Bound Brook, NJ (US); Chuan C. He, South Charleston, WV (US); Timothy R. Lynn, Glen Gardner, NJ (US); Roger L. Kuhlman, Lake Jackson, TX (US); John F. Szul, Hurricane, WV (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 16/623,862

(22) PCT Filed: Aug. 23, 2018

(86) PCT No.: PCT/US2018/047654
§ 371 (c)(1),
(2) Date: Dec. 18, 2019

(87) PCT Pub. No.: WO2019/046085
PCT Pub. Date: Mar. 7, 2019

(65) Prior Publication Data
US 2021/0147591 A1 May 20, 2021

Related U.S. Application Data

(60) Provisional application No. 62/550,905, filed on Aug. 28, 2017.

(51) Int. Cl.
*C08F 210/16* (2006.01)
*C08F 4/64* (2006.01)
*C08F 2/34* (2006.01)
*C08F 4/659* (2006.01)
*C08F 4/6592* (2006.01)
*C08L 23/08* (2006.01)

(52) U.S. Cl.
CPC ............ *C08F 210/16* (2013.01); *C08F 2/34* (2013.01); *C08F 4/65904* (2013.01); *C08F 4/65912* (2013.01); *C08F 4/65916* (2013.01); *C08F 4/65925* (2013.01); *C08L 23/0815* (2013.01); *C08L 2203/16* (2013.01); *C08L 2203/18* (2013.01); *C08L 2207/066* (2013.01)

(58) Field of Classification Search
CPC ............... C08F 210/16; C08F 2500/05; C08F 2500/12; C08F 2410/04
See application file for complete search history.

(56) References Cited

U.S. PATENT DOCUMENTS

| | | |
|---|---|---|
| 3,324,095 A | 6/1967 | Carrick |
| 3,709,853 A | 1/1973 | Karapinka |
| 4,003,712 A | 1/1977 | Miller |
| 4,011,382 A | 3/1977 | Levine et al. |
| 4,302,566 A | 11/1981 | Karol et al. |
| 4,543,399 A | 9/1985 | Jenkins, III et al. |
| 4,588,790 A | 5/1986 | Jenkins, III et al. |
| 4,882,400 A | 11/1989 | Dumain et al. |
| 4,988,783 A | 1/1991 | Beran et al. |
| 4,994,534 A | 2/1991 | Rhee et al. |
| 5,352,749 A | 10/1994 | DeChellis et al. |
| 5,462,999 A | 10/1995 | Griffin et al. |
| 5,541,270 A | 7/1996 | Chinh et al. |
| 5,627,242 A | 5/1997 | Jacobsen et al. |
| 5,665,818 A | 9/1997 | Tilston et al. |
| 5,677,375 A | 10/1997 | Rifi et al. |
| 6,489,408 B2 | 12/2002 | Mawson et al. |
| 6,534,604 B2 | 3/2003 | Loveday et al. |
| 7,193,017 B2 * | 3/2007 | Kwalk .............. F16L 9/127 525/191 |
| 7,250,473 B2 | 7/2007 | Schramm et al. |
| 7,312,279 B2 * | 12/2007 | Kwalk .............. C08J 5/18 525/191 |
| 7,601,783 B2 * | 10/2009 | Davis .............. C08F 10/00 525/191 |
| 7,858,702 B2 * | 12/2010 | Jaker .............. C08L 23/0815 525/191 |
| 7,868,092 B2 * | 1/2011 | Kwalk .............. C08L 23/0815 525/191 |
| 8,202,940 B2 * | 6/2012 | Jaker .............. B29C 48/67 525/191 |
| 8,378,029 B2 * | 2/2013 | Liu .............. C08F 10/02 525/191 |
| 8,476,370 B2 | 7/2013 | Backman et al. |
| 8,627,840 B2 | 1/2014 | Belloir et al. |
| 9,017,784 B2 | 4/2015 | Palmlof et al. |
| 9,249,286 B2 | 2/2016 | Joseph |
| 9,580,584 B2 * | 2/2017 | Hoecker .............. C08L 23/0815 |

(Continued)

FOREIGN PATENT DOCUMENTS

| | | |
|---|---|---|
| BE | 839380 | 9/1976 |
| EP | 2285843 | 2/2011 |
| EP | 3058002 | 8/2016 |

OTHER PUBLICATIONS

C. A. Hieber & H. H. Chiang, Rheol. Acta, 1989, 28: 321.

(Continued)

*Primary Examiner* — Rip A Lee

(57) ABSTRACT

A bimodal polyethylene composition made with a bimodal catalyst system, wherein the bimodal polyethylene composition has from greater than 0 to 14 weight percent of polyethylene polymers having a weight-average molecular weight of from greater than 0 to 10,000 grams per mol, products made therefrom, methods of making and using same, and articles containing same.

13 Claims, 3 Drawing Sheets

(56) References Cited

U.S. PATENT DOCUMENTS

| | | | |
|---|---|---|---|
| 9,587,055 B2 | 3/2017 | Chai et al. | |
| 9,671,047 B2 | 6/2017 | Vogt et al. | |
| 10,941,284 B2 * | 3/2021 | Chandak | C08F 10/02 |
| 2002/0107342 A1 | 8/2002 | Mawson et al. | |
| 2005/0054790 A1 | 3/2005 | Mawson et al. | |
| 2006/0036041 A1 | 2/2006 | Kwalk | |
| 2006/0173123 A1 | 8/2006 | Yang et al. | |
| 2011/0275772 A1 | 11/2011 | Savatsky et al. | |
| 2014/0242314 A1 | 8/2014 | Inn et al. | |
| 2015/0017365 A1 | 1/2015 | Sohn et al. | |
| 2015/0274947 A1 | 10/2015 | Vittorias et al. | |
| 2019/0256629 A1 * | 8/2019 | Chandak | C08F 210/02 |
| 2020/0071509 A1 * | 3/2020 | Borse | C08F 10/02 |
| 2021/0095109 A1 * | 4/2021 | Chandak | C08L 23/0815 |

OTHER PUBLICATIONS

C. A. Hieber & H. H. Chiang, Polym. Eng. Sci., 1992, 32: 931.
Janzen and Colby (J. Mol. Struct., 485/486, 569-584 (1999)).
R. B. Bird, R. C. Armstrong, & O. Hasseger, Dynamics of Polymeric Liquids, vol. 1, Fluid Mechanics, 2nd Edition, John Wiley & Sons, 1987.

\* cited by examiner

BIMODAL POLYETHYLENE

FIELD

The field includes a bimodal polyethylene, polyethylene compositions containing same, products made therefrom, methods of making and using same, and articles containing same.

INTRODUCTION

Polyethylene polymers have numerous commercial applications. These include films, sheets, injection molded articles, and extruded articles. The films and sheets are used in packaging applications and non-packaging applications. Examples are agricultural film, food packaging, garment bags, grocery bags, heavy-duty sacks, industrial sheeting, pallet and shrink wraps, and bags. The injection molded articles include buckets, freezer containers, lids, and toys. The extruded articles include pipes and coating layers of electrical cables.

Polyethylenes of Raised Temperature Resistance ("PE-RT") is a class of polyethylene polymers, defined by ISO-1043-1, for use in high temperature and industrial pipe applications, such as pipes for transporting hot or cold water. Typically PE-RT polymers have molecular structures and crystalline microstructures that provide hydrostatic pressure strength at high temperatures without needing to be cross-linked.

Certain polyethylenes are mentioned in US 2005/0054790 A1; US 2015/0017365 A1; U.S. Pat. No. 7,250,473 B2; and U.S. Pat. No. 9,017,784 B2.

US 2005/0054790 A1 to S. Mawson, et al. relates to a polymerization process, polymerization catalyst compositions, and methods for introducing the catalyst compositions into a polymerization reactor. Also methods of preparing a catalyst component slurry or solution and catalyst compositions. Also methods of controlling properties of polymer products utilizing the catalyst compositions, and to polymers produced therefrom.

US 2015/0017365 A1 to B-K Sohn, et al. relates to multimodal polyolefin resin and molded product prepared therefrom. The polyolefin resin satisfies all requirements of the following (1) to (5), (1) density 0.934 to 0.963 g/cm$^3$; (2) melt flow index (190° C., 2.16 kg load condition) 0.01 to 1.0 g/10 minutes; (3) Mw/Mn from 12 to 60 (Gel Permeation Chromatography); (4) at least two peaks appear when the molecular weight of the polyolefin resin is measured with Gel Permeation Chromatography; and (5) amount of polyolefin having Mw of 10,000 or less exceeds 15 weight percent and amount of polyolefin having Mw of 1,000,000 or more exceeds 1.5 weight percent, when molecular weight of the polyolefin resin is measured with Gel Permeation Chromatography.

U.S. Pat. No. 7,250,473 B2 to D. Schramm, et al. relates to a polyethylene resin having a multimodal molecular weight distribution, said resin being further characterized in that it has a density in the range of from about 0.925 g/ccm to about 0.950 g/ccm, a melt index (I2) in the range of from about 0.05 g/10 min. to about 5 g/10 min., and in that it comprises at least one high molecular weight ethylene interpolymer and at least a low molecular weight ethylene polymer, and a composition comprising such resin. Also a shaped article comprising said resin or composition, in particular a pipe.

U.S. Pat. No. 9,017,784 B2 to M. Palmlöf, et al. relates to a pipe made of a polyethylene composition comprising a polyethylene base resin, which comprises c. an ethylene copolymer as fraction (A), and d. an ethylene homo- or copolymer as fraction (B), with fraction (A) having a lower molecular weight than fraction (B), wherein the polyethylene base resin is obtainable in a polymerization process in which a single-site catalyst is used in the polymerization of at least one of fractions (A) and (B), the base resin having (i) a density of below 0.940 kg/m$^3$, and (ii) a MFR$_5$ at 190° C./5.00 kg of at least 0.20 g/10 min., and the polyethylene composition having a time to failure of at least 250 h measured according to ISO 1167 at 95° C. and 4.3 MPa.

SUMMARY

We recognized a problem that hurts the manufacturing, use, and performance of prior polyethylene (PE) compositions composed of a prior PE made with metallocene catalyst ("prior MCN-PE") and a prior PE made with Ziegler-Natta catalyst ("prior ZN-PE"). For example, their temperature resistance, as measured at raised temperature and tensile stress or pressure, may be unsatisfactory for use in PE-RT applications.

A technical solution to this problem was not obvious from the prior art. A problem to be solved by inventiveness is to discover a new PE composition that has improved PE-RT performance. Such a new PE composition would be useful in PE-RT applications.

Our technical solution to this problem includes a bimodal polyethylene composition ("bimodal PE composition") made with a bimodal catalyst system described later, wherein the bimodal PE composition has from greater than 0 to 14 weight percent (wt %) of ethylenic-containing chains having a formula molecular weight (MW) of from greater than 0 to 10,000 grams per mole (g/mol), based on total weight of ethylenic-containing components in the bimodal PE composition. The technical solution also provides products made therefrom, methods of making and using same, and articles containing same.

The inventive bimodal PE composition may be used in a number of industrial applications, including pipes.

DRAWINGS

FIG. 1 contains drawings of structural formulas of (pro) catalysts.

Figure 4:
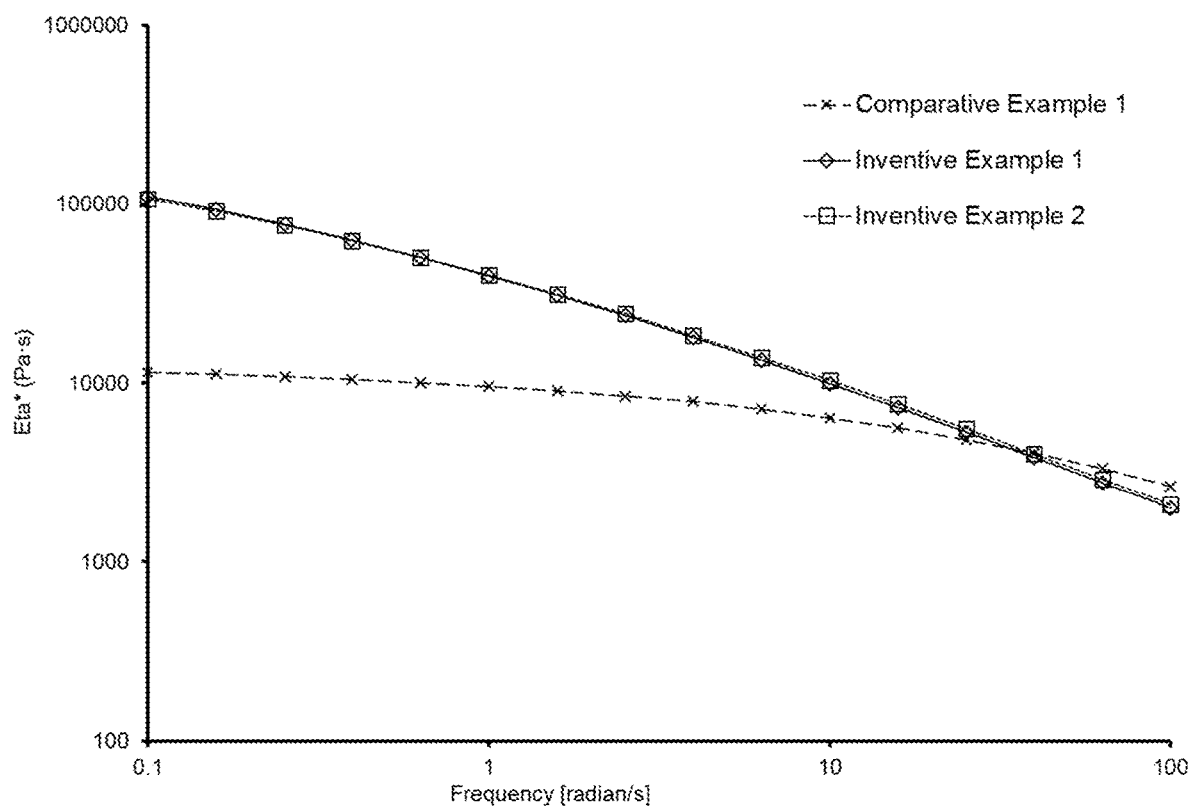

FIG. 4 is a plot of dynamic viscosity versus frequency of inventive examples 1 and 2 versus a monomodal comparative example 1.

DETAILED DESCRIPTION

The Summary and Abstract are incorporated here by reference.

Unpredictably, the inventive bimodal PE composition may be characterized by at least one improved property such as, for example, increased (greater) slow crack growth resistance (PENT test method), decreased hydrostatic failure, and/or increased processability. The inventive bimodal PE composition may be used to make pipes, films, sheets, extruded articles, and injection molded articles.

Certain inventive embodiments are described below as numbered aspects for easy cross-referencing. Additional embodiments are described elsewhere herein.

Aspect 1. A bimodal polyethylene composition comprising a lower molecular weight (LMW) polyethylene component and a higher molecular weight (HMW) polyethylene component, wherein each of the LMW and HMW polyethylene components comprises ethylene-derived monomeric units and ($C_3$-$C_{20}$)alpha-olefin-derived comonomeric units; and wherein the bimodal polyethylene composition is characterized by each of limitations (a) to (f): (a) a resolved bimodality (resolved molecular weight distribution) showing in a chromatogram of gel permeation chromatography (GPC) of the bimodal polyethylene composition, wherein the chromatogram shows a peak representing the HMW polyethylene component, a peak representing the LMW polyethylene component, and a local minimum in a range of Log(molecular weight) ("Log(MW)") 3.0 to 7.0 between the peak representing the HMW polyethylene component and the peak representing the LMW polyethylene component, measured according to the Bimodality Test Method, described later; (b) a density from 0.9300 to 0.9500 gram per cubic centimeter (g/cm³) measured according to ASTM D792-13 Method B; (c) a melt index measured according to ASTM D1238-13 at 190 degrees Celsius (° C.) under a load of 2.16 kilograms (kg) ("$I_2$" or "MI2") from 0.010 to less than 0.20 gram per 10 minutes (g/10 min.); (d) a flow index measured according to ASTM D1238-13 at 190° C. under a load of 21.6 kg ("$I_{21}$" or "FI21") from 8.0 to 15 g/10 min.; (e) a flow rate ratio (FRR) of the melt index to the flow index ("$I_{21}/I_2$") from 100.0 to 800.0; and (f) from greater than 0 to 14 wt % of ethylenic-containing chains having a formula molecular weight (MW) of from greater than 0 to 10,000 grams per mole (g/mol), based on total weight of ethylenic-containing components in the bimodal PE composition. The bimodal PE composition may have from less than 100.0 to 86 wt % of ethylenic-containing chains having a MW of greater than 10,000 g/mol. In the bimodal polyethylene composition, the MW of the lightest mass constituent may be different from embodiment to embodiment, so expression of MW in (f) as "from greater than 0 to 10,000 grams per mole" (i.e., from >0 to 10,000 g/mol) is a clear way to encompass all such embodiments. The term "ethylenic-containing chains" means macromolecules of ethylenic-containing components, which in turn are oligomers and/or polymers of ethylene and, optionally, one or more comonomers (e.g., alpha-olefins). The ethylenic-containing components include the LMW and HMW polyethylene components of the bimodal polyethylene composition. The terms "formula molecular weight" and "MW" mean the same thing and are mass of a macromolecule calculated from its molecular formula.

Aspect 2. The bimodal PE composition of aspect 1 characterized by at least one, alternatively each of limitations (a) to (f): (a) the local minimum of Log(MW) in the GPC chromatogram in a range of from 4.0 to 6.0 Log(MW), alternatively 4.5 to 5.5 Log(MW), alternatively 5.0 to 5.5 Log(MW) (e.g., Log(MW) is 5.05 to 5.25) between the peak representing the HMW polyethylene component and the peak representing the LMW polyethylene component, measured according to the Bimodality Test Method; (b) density from 0.931 to 0.9450 g/cm³, alternatively from 0.9310 to 0.9400 g/cm³, alternatively from 0.9310 to 0.9390 g/cm³, alternatively 0.933 to 0.938 g/cm³, alternatively from 0.935 to 0.937 g/cm³ measured according to ASTM D792-13 Method B; (c) melt index (I2) from 0.010 to 0.10 g/10 min., alternatively from 0.045 to 0.095 g/10 min. measured according to ASTM D1238-13 (190° C., 2.16 kg); (d) flow index ($I_{21}$) from 9 to 14, alternatively from 11 to 13 g/10 min.; (e) a flow rate ratio ($I_{21}/I_2$) from 110 to 600, alternatively 120 to 400, alternatively 130 to 300, alternatively 150 to 200; and (f) from 7.0 to less than 10.0 wt %, alternatively from 8.0 to 9.5 wt % of ethylenic-containing chains having MW of from greater than 0 to 10,000 g/mol, based on total weight of the ethylenic-containing components in the bimodal PE composition.

Aspect 3. The bimodal PE composition of aspect 2 characterized by at least one, alternatively each of limitations (a) to (f): (a) the local minimum of Log(MW) in the GPC chromatogram in a range of 5.0 to 5.5 Log(MW) between the peak representing the HMW polyethylene component and the peak representing the LMW polyethylene component, measured according to the Bimodality Test Method; (b) density from 0.935 to 0.942 g/cm³, alternatively 0.935 to 0.937 g/cm³ measured according to ASTM D792-13 Method B; (c) melt index (I2) from 0.045 to 0.095 g/10 min. measured according to ASTM D1238-13 (190° C., 2.16 kg); (d) flow index ($I_{21}$) from 9 to 14, alternatively from 11 to 13 g/10 min.; (e) a flow rate ratio ($I_{21}/I_2$) from 150 to 200; and (f) from 8.0 to 9.5 wt % of ethylenic-containing chains having MW of from greater than 0 to 10,000 g/mol.

Aspect 4. The bimodal PE composition of any one of aspects 1 to 3 further characterized by any one of limitations (g) to (l): (g) a molecular mass dispersity ($M_w/M_n$), $Đ_M$ (pronounced D-stroke M), from 5 to 30.1, alternatively from 7 to 25, alternatively from 10.1 to 20.1, all measured according to the Gel Permeation Chromatography (GPC) Test Method, described later; (h) no measurable, alternatively no detectable, amount of long chain branching per 1,000 carbon atoms ("LCB Index"), measured according to LCB Test Method (described later); (i) a shear thinning index value (SHI, $\eta^*(10)/\eta^*(200)$) of greater than 20, alternatively from >20 to 90, alternatively from 30 to 80, alternatively from 40 to 70, measured according to the Shear Thinning Index Test Method, described later; (j) a molecular mass dispersity ($M_w/M_n$), $Đ_M$, of the LMW polyethylene component of from 2.5 to 3.5, alternatively 2.8 to 3.3, alternatively 2.9 to 3.2 after deconvoluting the LMW and HMW polyethylene components of the bimodal PE composition according to the Deconvoluting Test Method, described later; and (k) a $M_w/M_n$ of the HMW polyethylene component from 2.5 to 4.5, alternatively from 3.0 to 4.5, alternatively from 3.2 to 4.1, alternatively from 3.3 to 4.0, all measured according to the GPC Test Method, described later, after deconvoluting the LMW and HMW polyethylene components of the bimodal PE composition according to the Deconvoluting Test Method, described later; (l) each of (g), (i), (j), and (k).

Aspect 5. The bimodal PE composition of any one of aspects 1 to 4 further characterized by at least one, alternatively each of limitations (i) to (iii): (i) a PENT test value of greater than 1000 hours, alternatively greater than 2000 hours measured at 90° C. and 2.4 megapascals (MPa) according to the PENT Test Method, described later; (ii) a Pipe Hydrostatic test value of greater than 1000 hours, alternatively greater than 2000 hours measured at 90° C. and 3.8 megapascals (MPa) according to the Pipe Hydrostatic Test Method 1, described later; and (iii) a Pipe Hydrostatic test value of greater than 1000 hours, alternatively greater than 2000 hours measured at 90° C. and 4.0 MPa according to the Pipe Hydrostatic Test Method 2, described later. In some aspects limitations (i) to (iii) are independently at most 20,000 hours, alternatively 10,000 hours, alternatively 5,000 hours.

Aspect 6. The bimodal PE composition of any one of aspects 1 to 5, wherein the ($C_3$-$C_{20}$)alpha-olefin-derived comonomeric units are further described by any one of limitations (i) to (vii): (i) $(C_3-C_{10})$alpha-olefin-derived comonomeric units; (ii) $(C_4-C_{10})$alpha-olefin-derived comonomeric units; (iii) $(C_4-C_8)$alpha-olefin-derived comonomeric units; (iv) 1-butene-derived comonomeric units; (v) 1-hexene-derived comonomeric units; (vi) 1-octene-derived comonomeric units; and (vii) a combination of any two of (iv) to (vi).

Aspect 7. A bimodal polyethylene composition made by copolymerizing ethylene (monomer) and at least one $(C_3-C_{20})$alpha-olefin (comonomer) with a mixture of a bimodal catalyst system and a trim solution in the presence of molecular hydrogen gas ($H_2$) and, optionally an induced condensing agent (ICA), in one, two or more polymerization reactors (e.g., in one fluidized bed gas phase reactor) under (co)polymerizing conditions; wherein prior to being mixed together the trim solution consists essentially of a (tetramethylcyclopentadienyl)(n-propylcyclopentadienyl)zirconium complex (procatalyst, e.g., (tetramethylcyclopentadienyl)(n-propylcyclopentadienyl)zirconium dimethyl) and an inert liquid solvent (e.g., liquid alkane) and the bimodal catalyst system consists essentially of an activator species (e.g., a methylaluminoxane species), a bis(2-pentamethylphenylamido)ethyl)amine zirconium complex and a (tetramethylcyclopentadienyl)(n-propylcyclopentadienyl)zirconiumcomplex, all disposed on a solid support (e.g., a hydrophobic fumed silica); and wherein the (co)polymerizing conditions comprise a reaction temperature from 85° to 105° C., alternatively 86° to 99° C., alternatively 89° to 96° C.; a molar ratio of the molecular hydrogen gas to the ethylene (H2/C2 molar ratio) from 0.0007 to 0.010, alternatively 0.0010 to 0.010, alternatively 0.0011 to 0.009; and a molar ratio of the comonomer (Comer) to the ethylene (Comer/C2 molar ratio) from 0.0005 to 0.02, alternatively 0.0007 to 0.015, alternatively 0.0010 to 0.013. The made bimodal PE composition may be that of any one of aspects 1 to 6. The comonomer may be 1-hexene. The $H_2$ may be present in the reactor(s) at a concentration of from 500 to 1,000 parts per million (ppm, weight), alternatively 600 to 900 ppm, alternatively 700 to 800 ppm by gas chromatography (GC). The ICA may be a $(C_4-C_{20})$alkane, such as isopentane.

Aspect 8. A method of making a bimodal polyethylene composition, the method comprising contacting ethylene (monomer) and at least one $(C_3-C_{20})$alpha-olefin (comonomer) with a mixture of a bimodal catalyst system and a trim solution in the presence of molecular hydrogen gas ($H_2$) and an induced condensing agent (ICA) in one, two or more polymerization reactors (e.g., in one fluidized bed gas phase reactor) under (co)polymerizing conditions, thereby making the bimodal polyethylene composition; wherein prior to being mixed together the trim solution consists essentially of a (tetramethylcyclopentadienyl)(n-propylcyclopentadienyl) zirconium complex (procatalyst, e.g., (tetramethylcyclopentadienyl)(n-propylcyclopentadienyl)zirconium dimethyl) and an inert liquid solvent (e.g., liquid alkane) and the bimodal catalyst system consists essentially of an activator species (e.g., a methylaluminoxane species), a non-metallocene ligand-Group 4 metal complex (e.g., bis(2-pentamethylphenylamido)ethyl)amine zirconium complex), and a metallocene ligand-Group 4 metal complex (e.g., (tetramethylcyclopentadienyl)(n-propylcyclopentadienyl) zirconium complex), all disposed on a solid support (e.g., a hydrophobic fumed silica); and wherein the (co)polymerizing conditions comprise a reaction temperature from 85° to 105° C., alternatively 86° to 104° C., alternatively 86° to 99° C., alternatively 89° to 96° C.; a molar ratio of the molecular hydrogen gas to the ethylene (H2/C2 molar ratio) from 0.0007 to 0.010, alternatively 0.0010 to 0.010, alternatively 0.0011 to 0.009; and a molar ratio of the comonomer (Comer) to the ethylene (Comer/C2 molar ratio) from 0.0005 to 0.02, alternatively 0.0007 to 0.015, alternatively 0.0010 to 0.013. The made bimodal PE composition may be that of any one of aspects 1 to 6. The comonomer may be 1-hexene. The $H_2$ may be present in the reactor(s) at a concentration of from 500 to 1,000 parts per million (ppm, weight), alternatively 600 to 900 ppm, alternatively 700 to 800 ppm by GC. In an alternative embodiment of aspect 7 or 8, the bimodal catalyst system may be prepared, and then fed into the polymerization reactor(s) as a suspension (e.g., slurry) in a mineral oil and the trim solution may be prepared, and then fed into the polymerization reactor(s) as a solution, e.g., in a liquid alkane.

Aspect 9. The bimodal polyethylene composition of aspect 7 or the method of aspect 8 may be further described by any one of limitations (i) to (vi): (i) wherein the bimodal catalyst system consists essentially of a bis(2-pentamethylphenylamido)ethyl)amine zirconium complex and a (tetramethylcyclopentadienyl)(n-propylcyclopentadienyl)zirconium complex in a molar ratio thereof from 1.0:1.0 to 5.0:1.0, respectively, alternatively 1.5:1.0 to 2.5:1.0, alternatively 2.0:1.0 to 4.0:1.0, 2.5:1.0 to 3.49:1.0, alternatively from 2.7:1.0 to 3.3:1.0, alternatively from 2.9:1.0 to 3.1:1.0, alternatively 1.5:1.0, alternatively 2.0:1.0, and a methylaluminoxane species, all disposed by spray-drying onto the solid support; (ii) wherein the bimodal catalyst system further consists essentially of mineral oil and the solid support is a hydrophobic fumed silica (e.g., a fumed silica treated with dimethyldichlorosilane); (iii) wherein the mixture is a suspension of the bimodal catalyst system in mineral oil and the trim solution and wherein the mixture is premade and then fed into the polymerization reactor(s); (iv) wherein the trim solution is made by dissolving (tetramethylcyclopentadienyl)(n-propylcyclopentadienyl)zirconium dimethyl in the inert liquid solvent (e.g., liquid alkane) to give the trim solution; (v) wherein the polymerization reactor(s) is one fluidized bed gas phase reactor and the method is a gas phase polymerization; and (vi) each of (i) to (v). The molar ratio of the bis(2-pentamethylphenylamido)ethyl) amine zirconium complex to the (tetramethylcyclopentadienyl)(n-propylcyclopentadienyl)zirconium complex may be based on molar ratio of their respective Zr atom contents, which may be calculated from ingredient weights (e.g., weights of bis(2-pentamethylphenylamido)ethyl)amine zirconium dibenzyl and (tetramethylcyclopentadienyl)(n-propylcyclopentadienyl)zirconium dichloride) or may be analytically measured.

Aspect 10. A manufactured article comprising a shaped form of the bimodal polyethylene composition of any one of aspects 1 to 7.

Aspect 11. The manufactured article of aspect 10 selected from: pipes, films, sheets, extruded articles, and injection molded articles. The manufactured article may be a pipe, alternatively a film, alternatively a blown film. The films and sheets may be used in packaging applications and non-packaging applications. Examples are agricultural film, food packaging, garment bags, grocery bags, heavy-duty sacks, industrial sheeting, pallet and shrink wraps, and bags. The injection molded articles include buckets, freezer containers, lids, and toys. The extruded articles include pipes and coating layers of electrical cables.

Aspect 12. A pipe composed of the bimodal PE composition of any one of aspects 1 to 7 and 9 and defining an interior volumetric space through which a substance may be transported. The pipe may be cylindrically shaped and configured with a cylindrical wall defining the interior volumetric space through which a substance may be transported.

Aspect 13. A method of transporting a substance, the method comprising moving a substance through the interior volumetric space of the pipe of aspect 12. The substance being transported may be a fluid such as a gas, vapor, liquid, slurry, or a combination of any two thereof. E.g., the substance may be water. In some aspects the water being transported may be at a temperature from 1° to 99° C.

The bimodal PE composition may contain residue or by-products formed from the bimodal catalyst system and trim solution used to make the bimodal PE composition. The bimodal PE composition may have zero, one, two, or more optional constituents if desired. Examples of optional constituents are additives such as colorants, antioxidants, processing aids (for polymer processing), lubricants, oxygen scavengers, chlorine scavengers, water extraction resistance compounds, and metal deactivators. In some aspects the bimodal PE composition of any one of aspects 1 to 7 and 9 (i) is prepared by a polymerization process that is free of a Ziegler-Natta catalyst, (ii) is free of titanium, or (iii) both (i) and (ii). E.g., the method of aspect 8 is free of a Ziegler-Natta catalyst and the bimodal PE composition made thereby is free of titanium.

10,000. A number equal to $1.0000 \times 10^4$, alternatively 10,000.0.

Activator (for activating procatalysts to form catalysts). Also known as co-catalyst. Any metal containing compound, material or combination of compounds and/or substances, whether unsupported or supported on a support material, that can activate a procatalyst to give a catalyst and an activator species. The activating may comprise, for example, abstracting at least one leaving group (e.g., at least one X in any one of the structural formulas in FIG. 1) from a metal of a procatalyst (e.g., M in any one of the structural formulas in FIG. 1) to give the catalyst. The catalyst may be generically named by replacing the leaving group portion of the name of the procatalyst with "complex". For example, a catalyst made by activating bis(2-pentamethylphenylamido) ethyl)amine zirconium dibenzyl may be called a "bis(2-pentamethylphenylamido)ethyl)amine zirconium complex". A catalyst made by activating (tetramethylcyclopentadienyl)(n-propylcyclopentadienyl)zirconium dichloride or (tetramethylcyclopentadienyl)(n-propylcyclopentadienyl)zirconium dimethyl may be called a "(tetramethylcyclopentadienyl)(n-propylcyclopentadienyl) zirconium complex". The catalyst made by activating (tetramethylcyclopentadienyl)(n-propylcyclopentadienyl)zirconium dichloride may be the same as or different than the catalyst made by activating (tetramethylcyclopentadienyl)(n-propylcyclopentadienyl)zirconium dimethyl. The metal of the activator typically is different than the metal of the procatalyst. The molar ratio of metal content of the activator to metal content of the procatalyst(s) may be from 1000:1 to 0.5:1, alternatively 300:1 to 1:1, alternatively 150:1 to 1:1. The activator may be a Lewis acid, a non-coordinating ionic activator, or an ionizing activator, or a Lewis base, an alkylaluminum, or an alkylaluminoxane. The alkylaluminum may be a trialkylaluminum, alkylaluminum halide, or alkylaluminum alkoxide (diethylaluminum ethoxide). The trialkylaluminum may be trimethylaluminum, triethylaluminum ("TEAl"), tripropylaluminum, triisobutylaluminum, and the like. The alkylaluminum halide may be diethylaluminum chloride. The alkylaluminoxane may be a methyl aluminoxane (MAO), ethyl aluminoxane, or isobutylaluminoxane. The activator may be a MAO that is a modified methylaluminoxane (MMAO). The corresponding activator species may be a derivative of the Lewis acid, non-coordinating ionic activator, ionizing activator, Lewis base, alkylaluminum, or alkylaluminoxane, respectively. The activator species may have a different structure or composition than the activator from which it is derived and may be a by-product of the activation of the procatalyst or a derivative of the byproduct. An example of the derivative of the byproduct is a methylaluminoxane species that is formed by devolatilizing during spray-drying of a bimodal catalyst system made with methylaluminoxane. The activator may be commercially available. An activator may be fed into the polymerization reactor(s) (e.g., one fluidized bed gas phase reactor) in a separate feed from that feeding the reactants used to make the bimodal catalyst system (e.g., supported bimodal catalyst system) and/or the trim solution thereinto. The activator may be fed into the polymerization reactor(s) in "wet mode" in the form of a solution thereof in an inert liquid such as mineral oil or toluene, in slurry mode as a suspension, or in dry mode as a powder.

Bimodal. Having at least 2, but not limited to 2, peaks in a molecular weight distribution (MWD) such as MWD measured by gel permeation chromatography (GPC). Also known as multimodal. In some aspects there are 2 or 3 peaks, alternatively only 2 peaks in the MWD.

Bimodal catalyst system. A combination of two or more catalyst compounds independently useful for enhancing rate of polymerization of a same olefin monomer and/or comonomer and yields a bimodal polyethylene composition. In some aspects the bimodal catalyst system has only two catalysts, and is prepared from two and only two procatalyst compounds. One of the catalyst compounds may be a metallocene catalyst compound and the other a non-metallocene catalyst compound. One of the catalyst compounds yields, under the (co)polymerizing conditions, the lower molecular weight (LMW) polyethylene component and the other catalyst compound yields the higher molecular weight (HMW) polyethylene component. The LMW and HMW polyethylene components together constitute the bimodal polyethylene composition, which may be the inventive PE composition, made with the bimodal catalyst system, and having a multimodal (e.g., bimodal) molecular weight distribution. Typically the bimodal catalyst system, method employing same, and inventive bimodal PE composition is free of a Ziegler-Natta catalyst and any residue or by-products therefrom.

The bimodal catalyst system may be made by contacting at least two procatalysts having different structures from each other with at least one of the activators. Each procatalyst may independently comprise a metal atom, at least one ligand bonded to the metal atom, and at least one leaving group bonded to and displaceable from the metal atom. Each metal may be an element of any one of Groups 3 to 14, e.g., a Group 4 metal. Each leaving group is H, an unsubstituted alkyl, an aryl group, an aralkyl group, a halide atom, an alkoxy group, or a primary or secondary amino group. In metallocenes, at least one ligand is a cyclopentadienyl or substituted cyclopentadienyl group. In non-metallocenes, no ligand is a cyclopentadienyl or substituted cyclopentadienyl group, and instead at least one ligand has at least one O, N, and/or P atom that coordinates to the metal atom. Typically the ligand(s) of the non-metallocene has at least two O, N, and/or P atoms that coordinates in a multidentate (e.g., bidentate or tridentate) binding mode to the metal atom. Discrete structures means the procatalysts and catalysts made therefrom have different ligands from each other, and either the same or a different metal atom, and either the same or different leaving groups.

Figure 1:
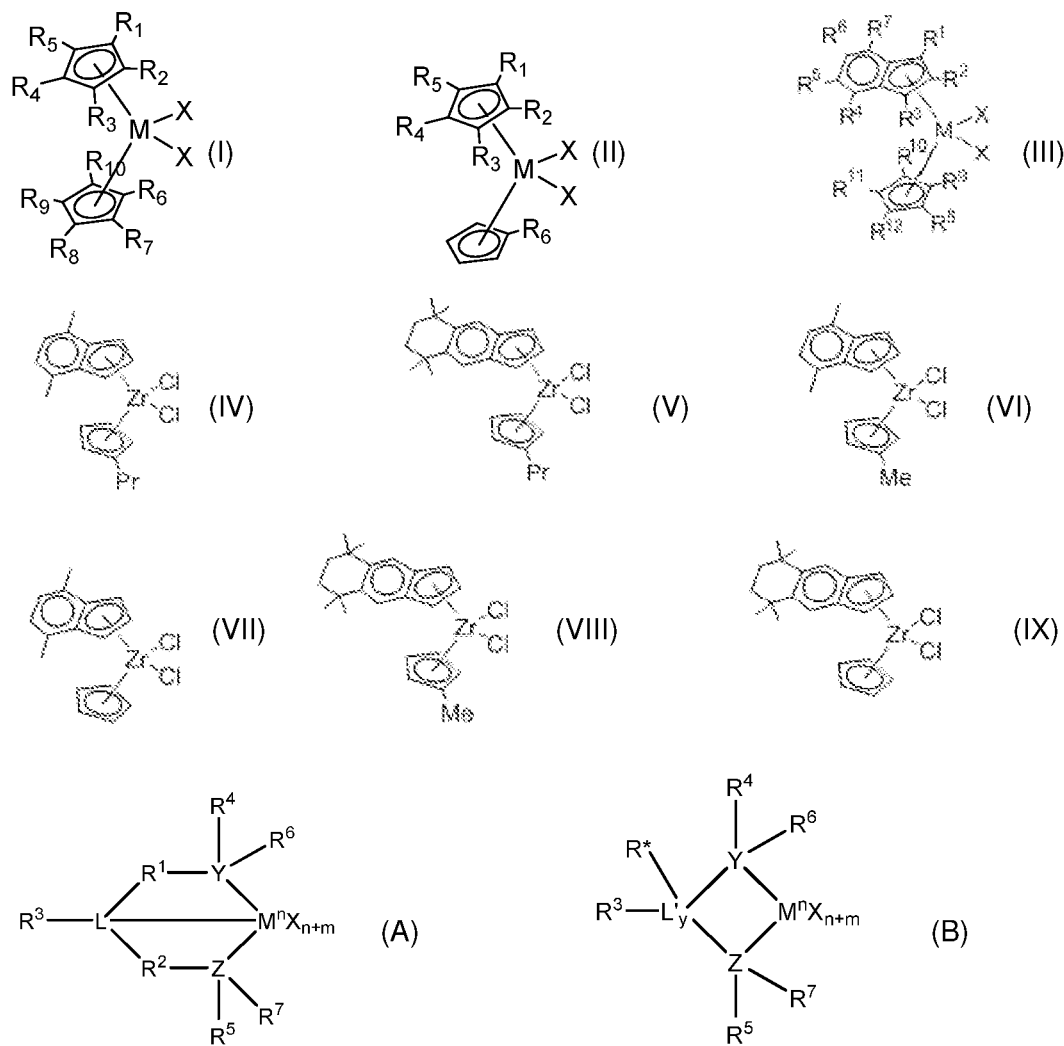

One of the procatalysts, useful for making a catalyst of the bimodal catalyst system and/or making the trim solution, may be a metallocene compound of any one of formulas (I) to (IX) and another of the procatalysts may be a non-metallocene of any one of formulas (A) and (B), wherein the formulas are drawn in FIG. 1.

In formula (I), FIG. 1, each of the $R^1$ to $R^{10}$ groups is independently H, a $(C_1-C_{20})$alkyl, $(C_6-C_{20})$aryl, or $(C_7-C_{20})$aralkyl group; M is a Group 4 metal; and each X is independently H, a halide, $(C_1-C_{20})$alkyl, or $(C_7-C_{20})$aralkyl group. In some aspects each of $R^7$ to $R^{10}$ is H in formula (I).

In formula (II), FIG. 1, each of the $R^1$ to $R^6$ groups is independently H, a $(C_1-C_{20})$alkyl, $(C_6-C_{20})$aryl, or $(C_7-C_{20})$aralkyl group; M is a Group 4 metal (e.g., Ti, Zr, or Hf); and each X is independently H, a halide, $(C_1-C_{20})$alkyl, or $(C_7-C_{20})$aralkyl group.

In formula (III), FIG. 1, each of the $R^1$ to $R^{12}$ groups is independently H, a $(C_1-C_{20})$alkyl, $(C_6-C_{20})$aryl, or $(C_7-C_{20})$aralkyl group, wherein at least one of $R^4$ to $R^7$ is not H; M is a Group 4 metal (e.g., Ti, Zr, or Hf); and each X is independently H, a halide, $(C_1-C_{20})$alkyl, or $(C_7-C_{20})$aralkyl group. In some aspects each of $R^9$ to $R^{12}$ is H in formula (III).

In some aspects each X in formulas (I) to (III) is independently a halide, $(C_1-C_4)$alkyl, or benzyl; alternatively Cl or benzyl. In some aspects each halide in formulas (I) to (III) is independently Cl, Br, or I; alternatively Cl or Br; alternatively C. In some aspects each M in formulas (I) to (III) is independently Ti, Zr, or Hf; alternatively Zr or Hf; alternatively Ti; alternatively Zr; alternatively Hf.

In formulas (IV) to (IX), FIG. 1, Me is methyl ($CH_3$), Pr is propyl (i.e., $CH_2CH_2CH_3$), and each "I" substituent on a ring represents a methyl group.

In formulas (A) and (B), FIG. 1, M is a Group 3 to 12 transition metal atom or a Group 13 or 14 main group metal atom, or a Group 4, 5, or 6 metal atom. M may be a Group 4 metal atom, alternatively Ti, Zr, or Hf; alternatively Zr or Hf; alternatively Zr. Each X is independently a leaving group as described above, such as an anionic leaving group. Subscript y is 0 or 1; when y is 0 group L is absent. Subscript n represents the formal oxidation state of metal atom M and is +3, +4, or +5; alternatively n is +4. L is a Group 15 or 16 element, such as nitrogen or oxygen; L' is a Group 15 or 16 element or Group 14 containing group, such as carbon, silicon or germanium. Y is a Group 15 element, such as nitrogen or phosphorus; alternatively nitrogen. Z is a Group 15 element, such as nitrogen or phosphorus; alternatively nitrogen. Subscript m is 0, −1, −2 or −3; alternatively −2; and represents the total formal charge of the Y, Z, and L in formula (A) and the total formal charge of the Y, Z, and L' in formula (B). $R^1$, $R^2$, $R^3$, $R^4$, $R^5$, $R^6$, and $R^7$ are independently H, a $(C_1-C_{20})$hydrocarbyl group, a $(C_1-C_{20})$heterohydrocarbyl group, or a $(C_1-C_{20})$organoheteryl group, wherein the $(C_1-C_{20})$heterohydrocarbyl group and $(C_1-C_{20})$organoheteryl group each independently have at least one heteroatom selected from Si, Ge, Sn, Pb, or P. Alternatively, $R^1$ and $R^2$ are covalently bonded to each other to form a divalent group of formula —$R^{1a}$—$R^{2a}$— and/or $R^4$ and $R^5$ are covalently bonded to each other to form a divalent group of formula —$R^{4a}$—$R^{5a}$—, wherein —$R^{1a}$—$R^{2a}$— and —$R^{4a}$—$R^{5a}$— are independently a $(C_1-C_{20})$hydrocarbylene group, a $(C_1-C_{20})$heterohydrocarbylene group, or a $(C_1-C_{20})$organoheterylene group. $R^3$ may be absent; alternatively $R^3$ is H, a halogen atom, a $(C_1-C_{20})$hydrocarbyl group, a $(C_1-C_{20})$heterohydrocarbyl group, or a $(C_1-C_{20})$organoheteryl group. $R^3$ is absent if, for example, L is 0, H, or an alkyl group. $R^4$ and $R^5$ may be a $(C_1-C_{20})$alkyl group, a $(C_6-C_{20})$aryl group, a substituted $(C_6-C_{20})$aryl group, a $(C_3-C_{20})$cycloalkyl group, a substituted $(C_3-C_{20})$cycloalkyl group, a $(C_8-C_{20})$bicyclic aralkyl group, or a substituted $(C_8-C_{20})$bicyclic aralkyl group. $R^6$ and $R^7$ may be H or absent. $R^*$ may be absent, or may be a hydrogen, a Group 14 atom containing group, a halogen, or a heteroatom containing group.

In some aspects the bimodal catalyst system may comprise a combination of a metallocene catalyst compound and a non-metallocene catalyst compound. The metallocene catalyst compound may be a metallocene ligand-metal complex such as a metallocene ligand-Group 4 metal complex, which may be made by activating (with the activator) a procatalyst compound selected from (pentamethylcyclopentadienyl)(n-propylcyclopentadienyl)zirconium dichloride, bis(n-butylcyclopentadienyl)zirconium dichloride, (pentamethylcyclopentadienyl)(n-propylcyclopentadienyl)zirconium dimethyl, and bis(n-butylcyclopentadienyl)zirconium dimethyl. The non-metallocene catalyst compound may be a non-metallocene ligand-metal complex such as a non-metallocene ligand-Group 4 metal complex, which may be made by activating (with the activator) a procatalyst compound selected from bis(2-(2,4,6-trimethylphenylamido)ethyl)amine zirconium dibenzyl and bis(2-(pentamethylphenylamido)ethyl)amine zirconium dibenzyl.

In some aspects the bimodal catalyst system may be made by activating, according to the method of contacting with an activator, a combination of a metallocene procatalyst compound that is (tetramethylcyclopentadienyl)(n-propylcyclopentadienyl)zirconium dichloride and a non-metallocene procatalyst compound that is bis(2-pentamethylphenylamido)ethyl)amine zirconium dibenzyl. The (tetramethylcyclopentadienyl)(n-propylcyclopentadienyl)zirconium-dichloride is a compound of formula (II) wherein M is Zr, each X is Cl, $R^6$ is propyl ($CH_2CH_2CH_3$), and each of $R^1$ to $R^4$ is methyl. The bis(2-pentamethylphenylamido)ethyl)amine zirconium dibenzyl is a procatalyst compound of formula (A) wherein M is Zr, each X is benzyl, $R^1$ and $R^2$ are each $CH_2CH_2$; $R^3$ is H; L, Y, and Z are all N; and $R^4$ and $R^5$ are each pentamethylphenyl; and $R^6$ and $R^7$ are absent.

Each of the catalyst compounds of the bimodal catalyst system independently may be unsupported, alternatively supported on a support material, in which latter case the bimodal catalyst system is a supported catalyst system. When each catalyst compound is supported, the catalyst compounds may reside on the same support material (e.g., same particles), or on different support materials (e.g., different particles). The bimodal catalyst system includes mixtures of unsupported catalyst compounds in slurry form and/or solution form. The support material may be a silica (e.g., fumed silica), alumina, a clay, or talc. The fumed silica may be hydrophilic (untreated), alternatively hydrophobic (treated). In some aspects the support is the hydrophobic fumed silica, which may be prepared by treating an untreated fumed silica with a treating agent such as dimethyldichlorosilane, a polydimethylsiloxane fluid, or hexamethyldisilazane. In some aspects the treating agent is dimethyldichlorosilane.

In some aspects the bimodal catalyst system is the bimodal catalyst system described in any one of the following references: U.S. Pat. No. 7,193,017 B2; U.S. Pat. No. 7,312,279 B2; U.S. Pat. No. 7,858,702 B2; U.S. Pat. No. 7,868,092 B2; U.S. Pat. No. 8,202,940 B2; and U.S. Pat. No.

8,378,029 B2 (e.g., column 4/line 60 to column 5/line 10 and column 10/lines 6 to 38 and Example 1).

The bimodal catalyst system may be fed into the polymerization reactor(s) in "dry mode" or "wet mode", alternatively dry mode, alternatively wet mode. The dry mode is fed in the form of a dry powder or granules. The wet mode is fed in the form of a suspension of the bimodal catalyst system in an inert liquid such as mineral oil. The bimodal catalyst system is commercially available under the PRODIGY™ Bimodal Catalysts brand, e.g., BMC-200, from Univation Technologies, LLC.

($C_3$-$C_{20}$)alpha-olefin. A compound of formula (I): $H_2C=C(H)$—R (I), wherein R is a straight chain ($C_1$-$C_{18}$) alkyl group. ($C_1$-$C_{18}$)alkyl group is a monovalent unsubstituted saturated hydrocarbon having from 1 to 18 carbon atoms. Examples of R are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl. In some embodiments the ($C_3$-$C_{20}$)alpha-olefin is 1-propene, 1-butene, 1-hexene, or 1-octene; alternatively 1-butene, 1-hexene, or 1-octene; alternatively 1-butene or 1-hexene; alternatively 1-butene or 1-octene; alternatively 1-hexene or 1-octene; alternatively 1-butene; alternatively 1-hexene; alternatively 1-octene; alternatively a combination of any two of 1-butene, 1-hexene, and 1-octene. The ($C_3$-$C_{20}$)alpha-olefin is used as a comonomer from which the comonomeric units of the LMW polyethylene component are derived may be the same as, alternatively different than, the ($C_3$-$C_{20}$)alpha-olefin from which the comonomeric units of the HMW polyethylene component are derived.

Consisting essentially of, consist(s) essentially of, and the like. Partially-closed ended expressions that exclude anything that would affect the basic and novel characteristics of that which they describe, but otherwise allow anything else. As applied to the description of a bimodal catalyst system embodiment consisting essentially of bis(2-pentamethylphenylamido)ethyl)amine zirconium dibenzyl and (tetramethylcyclopentadienyl)(n-propylcyclopentadienyl)zirconium dichloride, both disposed on a solid support and activated with an activating agent, the expression means the embodiment does not contain a Ziegler-Natta catalyst or any organic ligand other than the bis(2-pentamethylphenylamido)ethyl) amine, benzyl, tetramethylcyclopentadienyl, and n-propylcyclopentadienyl ligands. One or more of the benzyl and chloride leaving groups may be absent from the Zr in the bimodal catalyst system. The expression "consisting essentially of" as applied to the description of the "trim solution" means the trim solution is unsupported (i.e., not disposed on a particulate solid) and is free of a Ziegler-Natta catalyst or any organic ligand other than the tetramethylcyclopentadienyl and n-propylcyclopentadienyl ligands. The expression "consist essentially of" as applied to a dry inert purge gas means that the dry inert purge gas is free of, alternatively has less than 5 parts per million based on total parts by weight of gas of water or any reactive compound that could oxidize a constituent of the present polymerization reaction. In some aspects any one, alternatively each "comprising" or "comprises" may be replaced by "consisting essentially of" or "consists essentially of", respectively; alternatively by "consisting of" or "consists of", respectively.

Consisting of and consists of. Closed ended expressions that exclude anything that is not specifically described by the limitation that it modifies. In some aspects any one, alternatively each expression "consisting essentially of" or "consists essentially of" may be replaced by the expression "consisting of" or "consists of", respectively.

(Co)polymerizing conditions. Any result effective variable or combination of such variables, such as catalyst composition; amount of reactant; molar ratio of two reactants; absence of interfering materials (e.g., $H_2O$ and $O_2$); or a process parameter (e.g., feed rate or temperature), step, or sequence that is effective and useful for the inventive copolymerizing method in the polymerization reactor(s) to give the inventive bimodal PE composition.

At least one, alternatively each of the (co)polymerizing conditions may be fixed (i.e., unchanged) during production of the inventive bimodal PE composition. Such fixed (co) polymerizing conditions may be referred to herein as steady-state (co)polymerizing conditions. Steady-state (co)polymerizing conditions are useful for continuously making embodiments of the inventive bimodal PE composition having same polymer properties.

Alternatively, at least one, alternatively two or more of the (co)polymerizing conditions may be varied within their defined operating parameters during production of the inventive bimodal PE composition in order to transition from the production of a first embodiment of the inventive bimodal PE composition having a first set of polymer properties to a second embodiment of the inventive bimodal PE composition having a second set of polymer properties, wherein the first and second sets of polymer properties are different and are each within the limitations described herein for the inventive bimodal PE composition. For example, all other (co)polymerizing conditions being equal, a higher molar ratio of ($C_3$-$C_{20}$)alpha-olefin comonomer/ethylene feeds in the inventive method of copolymerizing produces a lower density of the resulting product inventive bimodal PE composition. At a given molar ratio of comonomer/ethylene, the molar ratio of the procatalyst of the trim solution relative to total moles of catalyst compounds of the bimodal catalyst system may be varied to adjust the density, melt index, melt flow, molecular weight, and/or melt flow ratio thereof. To illustrate an approach to making transitions, perform one of the later described inventive copolymerization examples to reach steady-state (co)polymerizing conditions. Then change one of the (co)polymerizing conditions to begin producing a new embodiment of the inventive bimodal PE composition. Sample the new embodiment, and measure a property thereof. If necessary, repeat the change condition/sample product/measure property steps at intervals until the measurement shows the desired value for the property is obtained. An example of such varying of an operating parameter includes varying the operating temperature within the aforementioned range from 85° to 100° C. such as by changing from a first operating temperature of 90° C. to a second operating temperature of 95° C., or by changing from a third operating temperature of 95° C. to a fourth operating temperature of 90° C. Similarly, another example of varying an operating parameter includes varying the molar ratio of molecular hydrogen to ethylene (H2/C2) from 0.0011 to 0.0013, or from 0.0012 to 0.0011. Similarly, another example of varying an operating parameter includes varying the molar ratio of comonomer (Comer) to the ethylene (Comer/C2 molar ratio) from 0.011 to 0.014, or from 0.014 to 0.011. Combinations of two or more of the foregoing example variations are included herein. Transitioning from one set to another set of the (co)polymerizing conditions is permitted within the meaning of "(co)polymerizing conditions" as the operating parameters of both sets of (co) polymerizing conditions are within the ranges defined therefore herein. A beneficial consequence of the foregoing transitioning is that any described property value for the inventive bimodal PE composition, or the LMW or HMW polyethylene component thereof, may be achieved by a person of ordinary skill in the art in view of the teachings herein.

The (co)polymerizing conditions may further include a high pressure, liquid phase or gas phase polymerization reactor and polymerization method to yield the inventive bimodal PE composition. Such reactors and methods are generally well-known in the art. For example, the liquid phase polymerization reactor/method may be solution phase or slurry phase such as described in U.S. Pat. No. 3,324,095. The gas phase polymerization reactor/method may employ the induced condensing agent and be conducted in condensing mode polymerization such as described in U.S. Pat. Nos. 4,453,399; 4,588,790; 4,994,534; 5,352,749; 5,462,999; and 6,489,408. The gas phase polymerization reactor/method may be a fluidized bed reactor/method as described in U.S. Pat. Nos. 3,709,853; 4,003,712; 4,011,382; 4,302,566; 4,543,399; 4,882,400; 5,352,749; 5,541,270; EP-A-0 802 202; and Belgian Patent No. 839,380. These patents disclose gas phase polymerization processes wherein the polymerization medium is either mechanically agitated or fluidized by the continuous flow of the gaseous monomer and diluent. Other gas phase processes contemplated include series or multistage polymerization processes such as described in U.S. Pat. Nos. 5,627,242; 5,665,818; 5,677,375; EP-A-0 794 200; EP-B1-0 649 992; EP-A-0 802 202; and EP-B-634421.

The (co)polymerizing conditions for gas or liquid phase reactors/methods may further include one or more additives such as a chain transfer agent, a promoter, or a scavenging agent. The chain transfer agents are well known and may be alkyl metal such as diethyl zinc. Promoters are well known such as in U.S. Pat. No. 4,988,783 and may include chloroform, CFCl3, trichloroethane, and difluorotetrachloroethane. Scavenging agents may be a trialkylaluminum. Slurry or gas phase polymerizations may be operated free of (not deliberately added) scavenging agents. The (co)polymerizing conditions for gas phase reactors/polymerizations may further include an amount (e.g., 0.5 to 200 ppm based on all feeds into reactor) static control agents and/or continuity additives such as aluminum stearate or polyethyleneimine. Static control agents may be added to the gas phase reactor to inhibit formation or buildup of static charge therein.

The (co)polymerizing conditions may further include using molecular hydrogen to control final properties of the LMW and/or HMW polyethylene components or inventive bimodal PE composition. Such use of $H_2$ is generally described in Polypropylene Handbook 76-78 (Hanser Publishers, 1996). All other things being equal, using hydrogen can increase the melt index (MI) or flow index (FI) thereof, wherein MI or FI are influenced by the concentration of hydrogen. A molar ratio of hydrogen to total monomer ($H_2$/monomer), hydrogen to ethylene ($H_2/C_2$), or hydrogen to comonomer ($H_2/\alpha$-olefin) may be from 0.0001 to 10, alternatively 0.0005 to 5, alternatively 0.001 to 3, alternatively 0.001 to 0.10.

The (co)polymerizing conditions may include a partial pressure of ethylene in the polymerization reactor(s) independently from 690 to 3450 kilopascals (kPa, 100 to 500 pounds per square inch absolute (psia), alternatively 1030 to 2070 kPa (150 to 300 psia), alternatively 1380 to 1720 kPa (200 to 250 psia), alternatively 1450 to 1590 kPa (210 to 230 psia), e.g., 1520 kPa (220 psia). 1.000 psia=6.8948 kPa.

Dry. Generally, a moisture content from 0 to less than 5 parts per million based on total parts by weight. Materials fed to the polymerization reactor(s) during a polymerization reaction under (co)polymerizing conditions typically are dry.

Ethylene. A compound of formula $H_2C=CH_2$. A polymerizable monomer.

Feeds. Quantities of reactants and/or reagents that are added or "fed" into a reactor. In continuous polymerization operation, each feed independently may be continuous or intermittent. The quantities or "feeds" may be measured, e.g., by metering, to control amounts and relative amounts of the various reactants and reagents in the reactor at any given time.

Film: for claiming purposes, properties are measured on 25 micrometers thick monolayer films.

Higher molecular weight (HMW). Relative to LMW, having a higher weight average molecular weight ($M_w$). The HMW polyethylene component of the inventive bimodal PE composition may have an $M_w$ from 10,000 to 1,000,000 g/mol. The lower endpoint of the $M_w$ for the HMW polyethylene component may be 20,000, alternatively 50,000, alternatively 100,000, alternatively 150,000, alternatively 200,000, alternatively 250,000, alternatively 300,000 g/mol. The upper endpoint of $M_w$ may be 900,000, alternatively 800,000, alternatively 700,000, alternatively 600,000 g/mol. In describing the inventive bimodal PE composition, the bottom portion of the range of $M_w$ for the HMW polyethylene component may overlap the upper portion of the range of $M_w$ for the LMW polyethylene component, with the proviso that in any embodiment of the inventive bimodal PE composition the particular $M_w$ for the HMW polyethylene component is greater than the particular $M_w$ for the LMW polyethylene component. The HMW polyethylene component may be made with catalyst prepared by activating a non-metallocene ligand-Group 4 metal complex.

Inert. Generally, not (appreciably) reactive or not (appreciably) interfering therewith in the inventive polymerization reaction. The term "inert" as applied to the purge gas or ethylene feed means a molecular oxygen ($O_2$) content from 0 to less than 5 parts per million based on total parts by weight of the purge gas or ethylene feed.

Induced condensing agent (ICA). An inert liquid useful for cooling materials in the polymerization reactor(s) (e.g., a fluidized bed reactor). In some aspects the ICA is a $(C_5$-$C_{20})$alkane, alternatively a $(C_{11}$-$C_{20})$alkane, alternatively a $(C_5$-$C_{10})$alkane. In some aspects the ICA is a $(C_5$-$C_{10})$alkane. In some aspects the $(C_5$-$C_{10})$alkane is a pentane, e.g., normal-pentane or isopentane; a hexane; a heptane; an octane; a nonane; a decane; or a combination of any two or more thereof. In some aspects the ICA is isopentane (i.e., 2-methylbutane). The inventive method of polymerization, which uses the ICA, may be referred to herein as being an induced condensing mode operation (ICMO). Concentration in gas phase measured using gas chromatography by calibrating peak area percent to mole percent (mol %) with a gas mixture standard of known concentrations of ad rem gas phase components. Concentration may be from 1 to 10 mol %, alternatively from 3 to 8 mole %.

Lower molecular weight (LMW). Relative to HMW, having a lower weight average molecular weight ($M_w$). The LMW polyethylene component of the inventive bimodal PE composition may have an $M_w$ from 3,000 to 100,000 g/mol. The lower endpoint of the $M_w$ for the LMW polyethylene component may be 5,000, alternatively 8,000, alternatively 10,000, alternatively 12,000, alternatively 15,000, alternatively 20,000 g/mol. The upper endpoint of $M_w$ may be 50,000, alternatively 40,000, alternatively 35,000, alternatively 30,000 g/mol. The LMW polyethylene component may be made with catalyst prepared by activating a metallocene ligand-Group 4 metal complex. As mentioned above, the bimodal PE composition has at most from greater than 0 to 14 wt % of polyethylene polymers having a $M_w$ of from greater than 0 to 10,000 g/mol, based on total weight of the polyethylene polymers in the bimodal PE composition.

Polyethylene. A macromolecule, or collection of macromolecules, composed of repeat units wherein 50 to 100 mole percent (mol %), alternatively 70 to 100 mol %, alternatively 80 to 100 mol %, alternatively 90 to 100 mol %, alternatively 95 to 100 mol %, alternatively any one of the foregoing ranges wherein the upper endpoint is <100 mol %, of such repeat units are derived from ethylene monomer, and, in aspects wherein there are less than 100 mol % ethylenic repeat units, the remaining repeat units are comonomeric units derived from at least one $(C_3-C_{20})$alpha-olefin; or collection of such macromolecules. Low density polyethylene (LDPE): generally having a density from 0.910 to 0.940 g/cm$^3$ measured according to ASTM D792-13 Method B. In some aspects the bimodal PE composition is a bimodal LDPE composition, alternatively a bimodal linear low density polyethylene (LLDPE) composition. LLDPE: generally having a density from 0.910 to 0.940 g/cm$^3$ measured according to ASTM D792-13 Method B and a substantially linear backbone structure.

Procatalyst. Also referred to as a precatalyst or catalyst compound (as opposed to active catalyst compound), generally a material, compound, or combination of compounds that exhibits no or extremely low polymerization activity (e.g., catalyst efficiency may be from 0 or <1,000) in the absence of an activator, but upon activation with an activator yields a catalyst that shows at least 10 times greater catalyst efficiency than that, if any, of the procatalyst.

Resolved (GPC chromatogram). A molecular weight distribution having two peaks separated by an intervening local minimum. For example, a resolved GPC chromatogram of the inventive polymers represented by a plot of dW/d log(MW) versus log(MW) that features local maxima dW/d log(MW) values for the LMW and HMW polyethylene component peaks, and a local minimum dW/d log(MW) value at a log(MW) between the maxima. The at least some separation of the peaks for the LMW and HMW polyethylene components in the chromatogram of the GPC. Typically the separation may not be down to baseline.

Start-up or restart of the polymerization reactor(s) illustrated with a fluidized bed reactor. The start-up of a recommissioned fluidized bed reactor (cold start) or restart of a transitioning fluidized bed reactor (warm start/transition) includes a time period that is prior to reaching the (co) polymerizing conditions. Start-up or restart may include the use of a seedbed preloaded or loaded, respectively, into the fluidized bed reactor. The seedbed may be composed of powder of polyethylene. The polyethylene of the seedbed may be a PE, alternatively a bimodal PE, alternatively a previously made embodiment of the inventive bimodal PE composition.

Start-up or restart of the fluidized bed reactor may also include gas atmosphere transitions comprising purging air or other unwanted gas(es) from the reactor with a dry (anhydrous) inert purge gas, followed by purging the dry inert purge gas from the reactor with dry ethylene gas. The dry inert purge gas may consist essentially of molecular nitrogen ($N_2$), argon, helium, or a mixture of any two or more thereof. When not in operation, prior to start-up (cold start), the fluidized bed reactor contains an atmosphere of air. The dry inert purge gas may be used to sweep the air from a recommissioned fluidized bed reactor during early stages of start-up to give a fluidized bed reactor having an atmosphere consisting of the dry inert purge gas. Prior to restart (e.g., after a change in seedbeds or prior to a change in alpha-olefin comonomer), a transitioning fluidized bed reactor may contain an atmosphere of unwanted alpha-olefin, unwanted ICA or other unwanted gas or vapor. The dry inert purge gas may be used to sweep the unwanted vapor or gas from the transitioning fluidized bed reactor during early stages of restart to give the fluidized bed reactor having an atmosphere consisting of the dry inert purge gas. Any dry inert purge gas may itself be swept from the fluidized bed reactor with the dry ethylene gas. The dry ethylene gas may further contain molecular hydrogen gas such that the dry ethylene gas is fed into the fluidized bed reactor as a mixture thereof. Alternatively the dry molecular hydrogen gas may be introduced separately and after the atmosphere of the fluidized bed reactor has been transitioned to ethylene. The gas atmosphere transitions may be done prior to, during, or after heating the fluidized bed reactor to the reaction temperature of the (co)polymerizing conditions.

Start-up or restart of the fluidized bed reactor also includes introducing feeds of reactants and reagents thereinto. The reactants include the ethylene and the alpha-olefin. The reagents fed into the fluidized bed reactor include the molecular hydrogen gas and the induced condensing agent (ICA) and the mixture of the bimodal catalyst system and the trim solution.

Trim solution. Any one of the metallocene procatalyst compounds or the non-metallocene procatalyst compounds described earlier dissolved in the inert liquid solvent (e.g., liquid alkane). The trim solution is mixed with the bimodal catalyst system to make the mixture, and the mixture is used in the inventive polymerization reaction to modify at least one property of the inventive bimodal PE composition made thereby. Examples of such at least one property are density, melt index MI2, flow index FI21, flow rate ratio, and molecular mass dispersity ($M_w/M_n$), $Ð_M$. The mixture of the bimodal catalyst system and the trim solution may be fed into the polymerization reactor(s) in "wet mode", alternatively may be devolatilized and fed in "dry mode". The dry mode is fed in the form of a dry powder or granules. When mixture contains a solid support, the wet mode is fed in the form of a suspension or slurry. In some aspects the inert liquid is a liquid alkane such as heptane.

Ziegler-Natta catalysts. Heterogeneous materials that enhance olefin polymerization reaction rates and typically are products that are prepared by contacting inorganic titanium compounds, such as titanium halides supported on a magnesium chloride support, with an activator. The activator may be an alkylaluminum activator such as triethylaluminum (TEA), triisobutylaluminum (TIBA), diethylaluminum chloride (DEAC), diethylaluminum ethoxide (DEAE), or ethylaluminum dichloride (EADC).

Advantageously we discovered the inventive bimodal PE. It unpredictably has at least one improved property such as, for example, increased (greater) slow crack growth resistance (PENT test method), decreased hydrostatic failure (e.g., increased time to hydrostatic failure), and/or increased processability.

Test samples of embodiments of unfilled and filled compositions may be separately made into compression molded plaques. The mechanical properties of these compositions may be characterized using test samples cut from the compression molded plaques.

A compound includes all its isotopes and natural abundance and isotopically-enriched forms. The enriched forms may have medical or anti-counterfeiting uses.

In some aspects any compound, composition, formulation, mixture, or reaction product herein may be free of any one of the chemical elements selected from the group consisting of: H, Li, Be, B, C, N, O, F, Na, Mg, Al, Si, P, S, C, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that chemical elements required by the compound, composition, formulation, mixture, or reaction product (e.g., C and H required by a polyolefin or C, H, and O required by an alcohol) are not excluded.

The following apply unless indicated otherwise. Alternatively precedes a distinct embodiment. ASTM means the standards organization, ASTM International, West Conshohocken, Pa., USA. IEC means the standards organization, International Electrotechnical Commission, Geneva, Switzerland. ISO means the standards organization, International Organization for Standardization, Geneva, Switzerland. Any comparative example is used for illustration purposes only and shall not be prior art. Free of or lacks means a complete absence of; alternatively not detectable. IUPAC is International Union of Pure and Applied Chemistry (IUPAC Secretariat, Research Triangle Park, N.C., USA). May confers a permitted choice, not an imperative. Operative means functionally capable or effective. Optional(ly) means is absent (or excluded), alternatively is present (or included). PPM are weight based. Properties are measured using a standard test method and conditions for the measuring (e.g., viscosity: 23° C. and 101.3 kPa). Ranges include endpoints, subranges, and whole and/or fractional values subsumed therein, except a range of integers does not include fractional values. Room temperature: 23° C.±1° C. Substituted when referring to a compound means having, in place of hydrogen, one or more substituents, up to and including per substitution.

Unless noted otherwise herein, use the following preparations for characterizations.

Bimodality Test Method: determine presence or absence of resolved bimodality by plotting dWf/d Log M (mass detector response) on y-axis versus Log M on the x-axis to obtain a GPC chromatogram curve containing local maxima log(MW) values for LMW and HMW polyethylene component peaks, and observing the presence or absence of a local minimum between the LMW and HMW polyethylene component peaks. The dWf is change in weight fraction, d Log M is also referred to as d Log(MW) and is change in logarithm of molecular weight, and Log M is also referred to as Log(MW) and is logarithm of molecular weight.

Deconvoluting Test Method: segment the chromatogram obtained using the Bimodality Test Method into nine (9) Schulz-Flory molecular weight distributions. Such deconvolution method is described in U.S. Pat. No. 6,534,604. Assign the lowest four MW distributions to the LMW polyethylene component and the five highest MW distributions to the HMW polyethylene component. Determine the respective weight percents (wt %) for each of the LMW and HMW polyethylene components in the inventive bimodal PE composition by using summed values of the weight fractions (Wf) of the LMW and HMW polyethylene components and the respective number average molecular weights ($M_n$) and weight average molecular weights ($M_w$) by known mathematical treatment of aggregated Schulz-Flory MW distributions.

Density Test Method: measured according to ASTM D792-13, *Standard Test Methods for Density and Specific Gravity (Relative Density) of Plastics by Displacement*, Method B (for testing solid plastics in liquids other than water, e.g., in liquid 2-propanol). Report results in units of grams per cubic centimeter (g/cm$^3$).

Flow Index (190° C., 21.6 kg, "$I_{21}$") Test Method: use ASTM D1238-13, *Standard Test Method for Melt Flow Rates of Thermoplastics by Extrusion Platometer*, using conditions of 190° C./21.6 kilograms (kg). Report results in units of grams eluted per 10 minutes (g/10 min.) or the equivalent in decigrams per 1.0 minute (dg/1 min.).

Flow Rate Ratio: (190° C., "$I_{21}/I_2$") Test Method: calculated by dividing the value from the Flow Index $FI_{21}$ Test Method by the value from the Melt Index I2 Test Method.

Gel permeation chromatography (GPC) Method: Weight-Average Molecular Weight Test Method: determine $M_w$, number average molecular weight ($M_n$), and $M_w/M_n$ using chromatograms obtained on a High Temperature Gel Permeation Chromatography instrument (HTGPC, Polymer Laboratories). The HTGPC is equipped with transfer lines, a differential refractive index detector (DRI), and three Polymer Laboratories PLgel 10 µm Mixed-B columns, all contained in an oven maintained at 160° C. Method uses a solvent composed of BHT-treated TCB at nominal flow rate of 1.0 milliliter per minute (mL/min.) and a nominal injection volume of 300 microliters (L). Prepare the solvent by dissolving 6 grams of butylated hydroxytoluene (BHT, antioxidant) in 4 liters (L) of reagent grade 1,2,4-trichlorobenzene (TCB), and filtering the resulting solution through a 0.1 micrometer (µm) Teflon filter to give the solvent. Degas the solvent with an inline degasser before it enters the HTGPC instrument. Calibrate the columns with a series of monodispersed polystyrene (PS) standards. Separately, prepare known concentrations of test polymer dissolved in solvent by heating known amounts thereof in known volumes of solvent at 160° C. with continuous shaking for 2 hours to give solutions. (Measure all quantities gravimetrically.) Target solution concentrations, c, of test polymer of from 0.5 to 2.0 milligrams polymer per milliliter solution (mg/mL), with lower concentrations, c, being used for higher molecular weight polymers. Prior to running each sample, purge the DRI detector. Then increase flow rate in the apparatus to 1.0 mL/min/, and allow the DRI detector to stabilize for 8 hours before injecting the first sample. Calculate $M_w$ and $M_n$ using universal calibration relationships with the column calibrations. Calculate MW at each elution volume with following equation:

$$\log M_X = \frac{\log(K_X/K_{PS})}{a_X+1} + \frac{a_{PS}+1}{a_X+1}\log M_{PS},$$

where subscript "X" stands for the test sample, subscript "PS" stands for PS standards, $a_{PS}$=0.67, $K_{PS}$=0.000175, and $a_X$ and $K_X$ are obtained from published literature. For polyethylenes, $a_X/K_X$=0.695/0.000579. For polypropylenes $a_X/K_X$=0.705/0.0002288. At each point in the resulting chromatogram, calculate concentration, c, from a baseline-subtracted DRI signal, $I_{DRI}$, using the following equation: c=$K_{DRI}I_{DRI}$/(dn/dc), wherein $K_{DRI}$ is a constant determined by calibrating the DRI, / indicates division, and dn/dc is the refractive index increment for the polymer. For polyethylene, dn/dc=0.109. Calculate mass recovery of polymer from the ratio of the integrated area of the chromatogram of concentration chromatography over elution volume and the injection mass which is equal to the pre-determined concentration multiplied by injection loop volume. Report all molecular weights in grams per mole (g/mol) unless otherwise noted. Further details regarding methods of determining Mw, Mn, MWD are described in US 2006/0173123 page 24-25, paragraphs [0334] to [0341]. Plot of dW/d Log(MW)

on the y-axis versus Log(MW) on the x-axis to give a GPC chromatogram, wherein Log(MW) and dW/d Log(MW) are as defined above.

Long Chain Branching (LCB) Test Method: calculate number of long chain branches (LCB) per 1,000 carbon atoms of a test polymer using a correlation developed by Janzen and Colby (*J. Mol. Struct.*, 485/486, 569-584 (1999)) between zero shear viscosity, no, and $M_w$. Their correlation is drawn as a reference line on a reference graph of $\eta_o$ on the y-axis and $M_w$ on the x-axis. Then a test polymer is characterized by (a) and (b): (a) using the Zero Shear Viscosity Determination Method described later, measuring the test polymer's small-strain (10%) oscillatory shear, and using a three parameter Carreau-Yasuda empirical model ("CY Model") to determine values for $\eta_o$ therefrom; and (b) using the GPC Test Method described earlier, measuring the test polymer's $M_w$. Plot the results for the test polymer's no and $M_w$ on the reference graph, and compare them to the reference line. Results for test polymers with zero (0) long chain branching per 1,000 carbon atoms will plot below the Janzen and Colby reference line, whereas results for test polymers having long chain branching >0 per 1,000 carbon atoms will plot above the Janzen and Colby reference line. The CY Model is well-known from R. B. Bird, R. C. Armstrong, & O. Hasseger, *Dynamics of Polymeric Liquids, Volume 1, Fluid Mechanics*, 2$^{nd}$ Edition, John Wiley & Sons, 1987; C. A. Hieber & H. H. Chiang, *Rheol. Acta*, 1989, 28: 321; and C. A. Hieber & H. H. Chiang, *Polym. Eng. Sci.*, 1992, 32: 931.

Melt Index (190° C., 2.16 kilograms (kg), "$I_2$") Test Method: for ethylene-based (co)polymer is measured according to ASTM D1238-13, using conditions of 190° C./2.16 kg, formerly known as "Condition E" and also known as $MI_2$. Report results in units of grams eluted per 10 minutes (g/10 min.) or the equivalent in decigrams per 1.0 minute (dg/1 min.). 10.0 dg=1.00 g. Melt index is inversely proportional to the weight average molecular weight of the polyethylene, although the inverse proportionality is not linear. Thus, the higher the molecular weight, the lower the melt index.

PENT Test Method (90° C., 2.4 MPa): ASTM F1473-16, *Standard Test Method for Notch Tensile Test to Measure the Resistance to Slow Crack Growth of Polyethylene Pipes and Resins*. Also known as the Pennsylvania Notch Test ("PENT"). Prepare test specimens from compression molded plaques, precisely notch specimens, and then expose notched specimens to a constant tensile stress at elevated temperature in air.

Pipe Hydrostatic Test Methods 1 and 2 (90° C., 3.8 or 4.0 MPa, respectively): Characterized as a PE-RT Type II material that when evaluated in accordance with ISO 9080 or equivalent, with internal pressure tests being carried out in accordance with ISO 1167-1 and ISO 1167-2, the inventive composition conforms to the 4-parameter model given in ISO 24033 for PE-RT Type II material over a range of temperature and internal pressure as provided in ISO 22391. Thus, embodiments of the inventive bimodal polyethylene composition can be referred to herein as a bimodal polyethylene of raised temperature resistance or PE-RT. As a short-term screening test ("water-in-water"), perform hydrostatic testing, as described in ISO 22391-2, pipes composed of test material by following ISO 24033:2009 at two specific hydrostatic conditions, namely 3.8 MPa and 90° C. or 4.0 MPa and 90° C. The pipes for testing are SDR 11 pipes having a 1-inch (25.4 mm) diameter, a 0.12 inch (3 mm) wall thickness, and a length of 18 inches (457 mm). The pipes are prepared by extrusion of polymer melt at a temperature inside the extruder maintained at 204.4° C. (400° F.) and polymer feed rate of 130.6 kg/hour (288 pounds/hour) using a Maplan model SS60-30 pipe extruder having an annular die defining a die-gap opening. The molten pipe profile coming out of the annular die is drawn down from the die-gap opening into the interior of a sizing sleeve by a puller located further downstream and operating at a puller speed of 8.1 meters per minute (26.57 feet/minute). As pipe is moved through the sizing sleeve, a vacuum pulls the molten pipe profile against the interior of the sleeve. Cooling Water enters the sizing sleeve, cooling the pipe and maintaining established dimensions and smooth surface.

Shear Thinning Index (SHI) Test Method: Perform small-strain (10%) oscillatory shear measurements on polymer melts at 190° C. using an ARES-G2 Advanced Rheometric Expansion System, from TA Instruments, with parallel-plate geometry to obtain the values of storage modulus (G'), loss modulus (G") complex modulus (G*) and complex viscosity ($\eta^*$) as a function of frequency ($\omega$). Obtain a SHI value by calculating the complex viscosities at given values of complex modulus, and calculating the ratio of the two viscosities. For example, using the values of complex modulus of 10 kilopascal (kPa) and 200 kPa, obtain the $\eta^*(10\ kPa)$ and $\eta^*(200\ kPa)$ at a constant value of complex modulus of 10 kPa and 200 kPa, respectively. The shear thinning index SHI(10/200) is defined as the ratio of the two viscosities $\eta^*(10\ kPa)$ and $\eta^*(200\ kPa)$, i.e. $\eta^*(10)/\eta^*(200)$.

Zero Shear Viscosity Determination Method: perform small-strain (10%) oscillatory shear measurements on polymer melts at 190° C. using an ARES-G2 Advanced Rheometric Expansion System, from TA Instruments, with parallel-plate geometry to obtain complex viscosity $|\eta^*|$ versus frequency ($\omega$) data. Determine values for the three parameters-zero shear viscosity, no, characteristic viscous relaxation time, $\tau_\eta$, and the breadth parameter, a,—by curve fitting the obtained data using the following CY Model:

$$|\eta^*(\omega)| = \frac{\eta_o}{[1+(\tau_\eta \omega)^a]^{\frac{(1-n)}{a}}},$$

wherein $|\eta^*(\omega)|$ is magnitude of complex viscosity, $\eta_o$ is zero shear viscosity, $\tau_\eta$ is viscous relaxation time, a is the breadth parameter, n is power law index, and w is angular frequency of oscillatory shear.

Bimodal catalyst system 1: consisted essentially of or made from bis(2-pentamethylphenylamido)ethyl)amine zirconium dibenzyl and (tetramethylcyclopentadienyl)(n-propylcyclopentadienyl)zirconium dichloride spray-dried in a 3:1 molar ratio onto CAB-O-SIL TS610, a hydrophobic fumed silica made by surface treating hydrophilic (untreated) fumed silica with dimethyldichlorosilane support, and methylaluminoxane (MAO), and fed into a gas phase polymerization reactor as a slurry in mineral oil. The molar ratio of moles MAO to (moles of bis(2-pentamethylphenylamido)ethyl)amine zirconium dibenzyl+moles (tetramethylcyclopentadienyl)(n-propylcyclopentadienyl)zirconium dichloride) was 140:1.

Comonomer 1: 1-Hexene, used at a molar ratio of 1-hexene/C2 in Table 1.

Ethylene ("C2"): partial pressure of C2 was maintained as described later in Table 1.

Induced condensing agent 1 ("ICA1"): isopentane, used at a mole percent (mol %) concentration in the gas phase of a gas phase reactor relative to the total molar content of gas phase matter. Reported later in Table 1.

Molecular hydrogen gas ("$H_2$"): used at a molar ratio of H2/C2 in Table 1.

Trim solution 1: consisted essentially of or made from (tetramethylcyclopentadienyl)(n-propylcyclopentadienyl) zirconium dimethyl (procatalyst) dissolved in heptane to give a solution having a concentration of 0.7 gram procatalyst per milliliter solution (g/mL). The trim solution is further diluted in isopentane to a concentration of 0.04 wt %.

Comparative Example 1 (CE1): a monomodal polyethylene having a density of 0.937 g/cm3; I2 of 0.61 g/10 min., I21 of 11.1 g/10 min. I21/I2 of 18.2, Mn of 42,050, Mw of 129,320, a molecular mass dispersity ($M_w/M_n$), $Ð_M$ of 3.08, was obtained as product QHM 22F from Qilu Petrochemical, People's Republic of China.

Inventive Example 1 (IE1): Produced the bimodal PE composition of IE1 in a single gas phase polymerization reactor containing a pilot plant scale continuous mode, gas phase fluidized bed reactor with a capacity of producing 22 to 110 kg resin per hour. For an experimental run, preloaded the reactor before startup with a seedbed of granular resin inside. Dried down the reactor with the seedbed below 5 ppm moisture with high purity nitrogen. Then introduced reaction constituent gases to the reactor to build a gas phase condition. At the same time heated the reactor up to the desired temperature. Charged the reactor with hydrogen gas sufficient to produce a molar ratio of hydrogen to ethylene of 0.0012 at the reaction conditions, and charged the reactor with 1-hexene to produce a molar ratio of 1-hexene to ethylene of 0.0135 at reaction conditions. Pressurized the reactor with ethylene (total pressure=220 psi) and kept the reactor temperature at 90° C. Once the (co)polymerizing conditions were reached, injected a feed of a slurry of Bimodal Catalyst System1 into the reactor. Meanwhile mixed a trim solution feed with the feed of Bimodal Catalyst System1 to give a mixture thereof, which is then fed into the reactor, wherein mixing was done at varying molar ratios ranging from 1.5 to 2.0 ($Zr_{catalyst}/Zr_{trim}$, mol/mol) to fine tune flow index and melt index of inventive bimodal polyethylene composition to desired target values. Used about three bed turnovers to reach steady-state production of the bimodal polyethylene, thereby giving the embodiment of the inventive bimodal PE (product) of IE1. Collected the inventive bimodal PE of IE1 from the reactor's product discharge outlet and characterized its properties. Operating constituents and parameters are summarized below in Table 1. Properties of the product inventive bimodal PE of IE1 are summarized later in Table 2.

Inventive Example 2 (IE2): replicated the procedure of IE1 except kept reactor temperature at 95° C.

TABLE 1

Operating constituents/parameters for Inventive Example IE1 and IE2.

| Reaction Constituent/Parameter | (co)polymerizing condition |
| --- | --- |
| Reactor | single, continuous-mode, fluidized bed |
| Starting seedbed = granular PE resin | Preloaded in reactor |
| Reactor Purging method | Anhydrous $N_2$ gas |
| Ethylene ("C2") | 1500 kPa partial pressure |
| Comonomer = 1-hexene | molar ratio of 1-hexene/C2 = 0.011 to 0.016 |
| Molecular hydrogen gas ("$H_2$") | molar ratio of H2/C2 = 0.0012 |
| Induced Condensing Agent 1: isopentane | 7 to 8 mol % |
| Operating temperature | 90° (IE1) or 95° (IE2) C. |
| Bed weight | 50 kg |
| Superficial gas velocity (SGV, meters/second) | 0.60 |

Comparative Example (A): preparation of a pipe from the PE of CE1. Uses composition CE1 to prepare SDR 11 pipes according to Pipe Hydrostatic Test Methods 1 and 2 above.

Inventive Examples (A) and (B): Preparation of pipes from the inventive bimodal PE of IE1 and IE2, respectively. Uses compositions IE1 or IE2 to prepare SDR 11 pipes according to Pipe Hydrostatic Test Method 1 or 2 above.

TABLE 2 properties of inventive bimodal PE of 1E1, 1E2, IE(A), IE(B), CE1, and CE(A).

| Polymer Property Measured | CE1 | IE1 | IE2 |
| --- | --- | --- | --- |
| Density (ASTM D792-13) | 0.937 g/cm³ | 0.936 g/cm³ | 0.936 g/cm³ |
| Melt Index $I_2$ (190° C., 2.16 kg, ASTM D1238-04) | 0.61 g/10 min. | 0.062 g/10 min. | 0.063 g/10 min. |
| Flow Index $I_{21}$ (190° C., 21.6 kg, ASTM D1238-04) | 11.1 g/10 min. | 12.1 g/10 min. | 10.9 g/10 min. |
| Flow Rate Ratio ($I_{21}/I_2$) | 18.2 | 194 | 173 |
| SHI ($\eta^*(10)/\eta^*(200)$) | 2.76 | 60.5 | 46.4 |
| Composition Number-average molecular weight ($M_n$) | 42,050 g/mol | 21,030 g/mol | 23,710 g/mol |
| Composition Weight-average molecular weight ($M_w$) | 129,320 g/mol | 355,610 g/mol | 326,630 g/mol |
| Composition Molecular mass dispersity ($M_w/M_n$), $Ð_M$ | 3.08 | 16.9 | 13.8 |
| Resolved Bimodality (GPC local minimum) | No | Yes, at 5.2 LogM | Yes, at 5.2 LogM |
| LMW Polyethylene Component Concentration (wt %) | Not applicable | 67.8 | 67.0 |
| HMW Polyethylene Component Concentration (wt %) | Not applicable | 32.2 | 33.0 |
| LMW Polyethylene Component $M_n$ (g/mol) | Not applicable | 13,980 | 15,780 |

TABLE 2-continued properties of inventive bimodal PE of 1E1, 1E2, IE(A), IE(B), CE1, and CE(A).

| Polymer Property Measured | CE1 | IE1 | IE2 |
|---|---|---|---|
| HMW Polyethylene Component $M_n$ (g/mol) | Not applicable | 266,280 | 257,640 |
| LMW Polyethylene Component $M_w$ (g/mol) | Not applicable | 43,590 | 46,030 |
| HMW Polyethylene Component $M_w$ (g/mol) | Not applicable | 1,015,900 | 901,059 |
| $M_w/M_n$, $Đ_M$, of the LMW polyethylene component | Not applicable | 3.12 | 2.92 |
| $M_w/M_n$, $Đ_M$, of the HMW polyethylene component | Not applicable | 3.82 | 3.50 |
| PENT Test Method (hours) | 467 (failed) | >1000 | >1000 |
| Pipe Hydrostatic Test Method 2 (90° C., 4.0 MPa) | >2000 hours | >2000 hours | >2000 hours |
| Pipe Hydrostatic Test Method 1 (90° C., 3.8 MPa) | >2000 hours | >2000 hours | >2000 hours |

Figure 2:
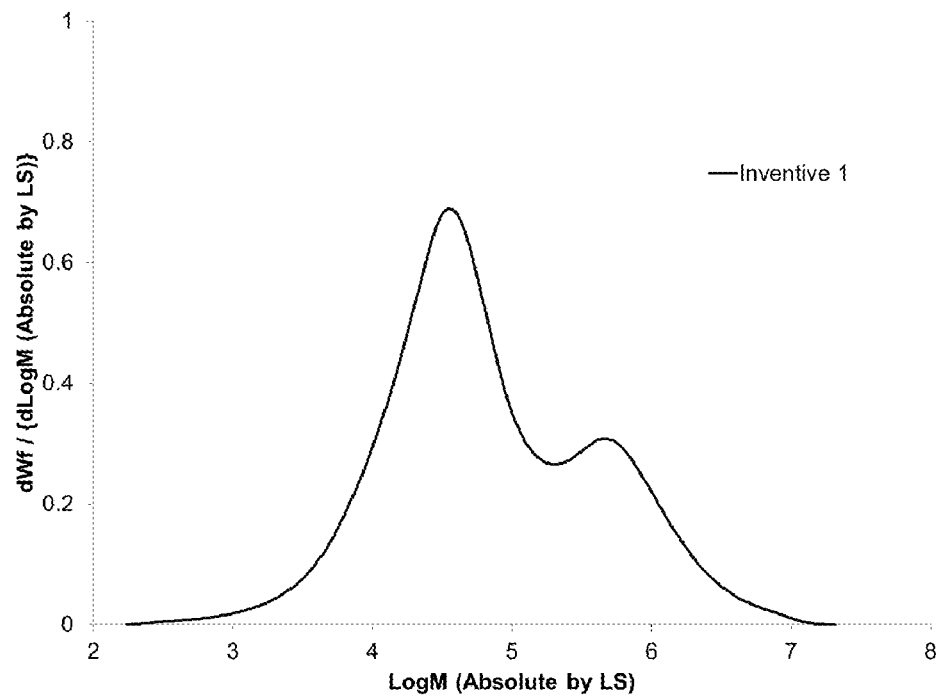
FIG. 2 is a GPC chromatogram of inventive example 1 of the inventive bimodal PE composition.
Figure 3:
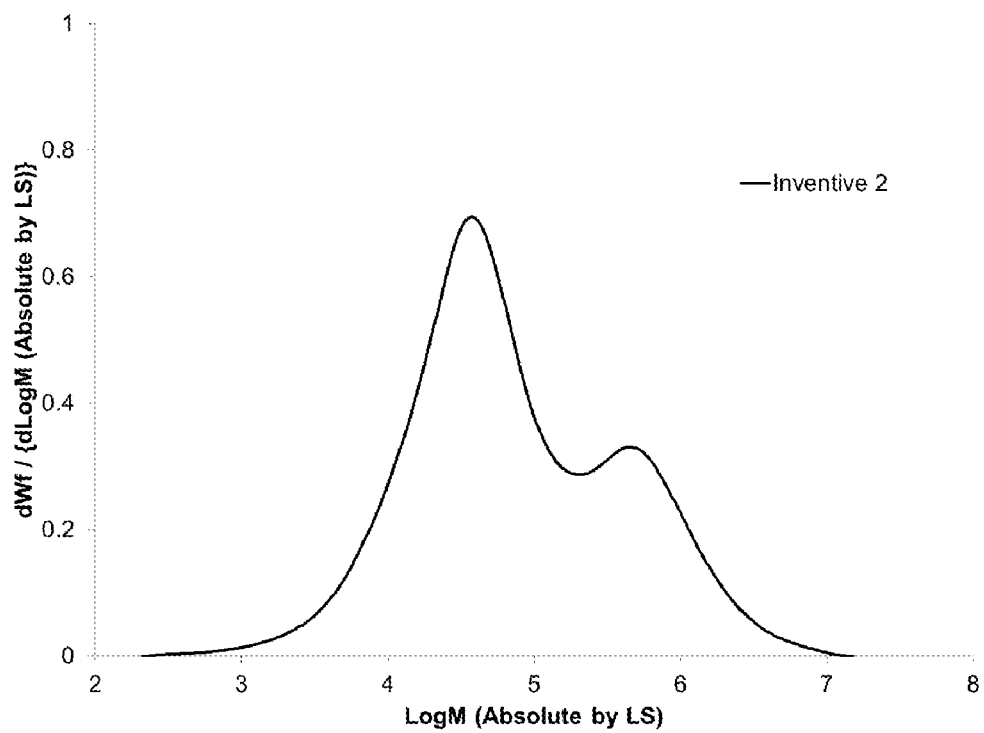
FIG. 3 is a GPC chromatogram of inventive example 2 of the inventive bimodal PE composition.

In some aspects the inventive bimodal PE is characterized by any one of the properties listed in Table 2 for IE1 or IE2, wherein the property is defined by a range having a midpoint equal to the property value listed in Table 2 and maximum and minimum endpoints equal to, respectively, plus-or-minus (±) 55%, alternatively ±25%, alternatively ±15%, alternatively ±11%, alternatively ±5%. The expected resolved bimodalities for IE1 and IE2 are illustrated by the chromatograms in FIGS. 2 and 3, respectively, wherein the peaks for the respective LMW polyethylene components are each at approximately 4.4 Log M, the peaks for the respective HMW polyethylene components are each at approximately 5.8 Log M, and the respective local minimums are each at approximately 5.2 Log M. The chromatograms in FIGS. 2 and 3 each reach baseline at approximately 2.2 Log M and approximately 7.5 Log M.

Incorporate by reference here the below claims as numbered aspects except replace "claim" and "claims" by "aspect" or "aspects," respectively.

The invention claimed is:

1. A bimodal polyethylene composition comprising a lower molecular weight (LMW) polyethylene component and a higher molecular weight (HMW) polyethylene component, wherein each of the LMW and HMW polyethylene components comprises ethylene-derived monomeric units and ($C_3$-$C_{20}$)alpha-olefin-derived comonomeric units; and wherein the bimodal polyethylene composition is characterized by each of limitations (a) to (f): (a) a resolved bimodality (resolved molecular weight distribution) showing in a gel permeation chromatography (GPC) chromatogram of the bimodal polyethylene composition, wherein the GPC chromatogram shows a peak representing the HMW polyethylene component, a peak representing the LMW polyethylene component, and a local minimum in a range of log(molecular weight) ("log(MW)") 3.0 to 7.0 between the peak representing the HMW polyethylene component and the peak representing the LMW polyethylene component, measured according to a Bimodality Test Method, described herein; (b) a density from 0.9310 to 0.9450 gram per cubic centimeter (g/cm³) measured according to ASTM D792-13 Method B; (c) a melt index measured according to ASTM D1238-13 at 190 degrees Celsius (° C.) under a load of 2.16 kilograms (kg) ($I_2$ or MI2) from 0.010 to less than 0.20 gram per 10 minutes (g/10 min); (d) a flow index measured according to ASTM D1238-13 at 190° C. under a load of 21.6 kg ($I_{21}$ or FI21) from 8.0 to 15 g/10 min; (e) a flow rate ratio (FRR) of the flow index to the melt index ($I_{21}/I_2$) from 100.0 to 800.0; (f) from greater than 0 to 14 wt % of ethylenic-containing chains having a molecular weight (MW) of from greater than 0 to 10,000 grams per mole (g/mol), based on total weight of ethylenic-containing components in the bimodal polyethylene composition; and (g) a molecular mass dispersity ($M_w/M_n$), $Đ_M$, from 7 to 25 measured according to a Gel Permeation Chromatography (GPC) Test Method, described herein.

2. The bimodal polyethylene composition of claim 1 characterized by at least one of limitations (a) to (f): (a) the local minimum in the GPC chromatogram in a range of log(MW) from 4.0 to 6.0 between the peak representing the HMW polyethylene component and the peak representing the LMW polyethylene component, measured according to the Bimodality Test Method; (b) density from 0.9310 to 0.9400 g/cm³ measured according to ASTM D792-13 Method B; (c) melt index ($I_2$) from 0.010 to 0.10 g/10 min measured according to ASTM D1238-13 (190° C., 2.16 kg); (d) flow index ($I_{21}$) from 9 to 14 g/10 min; (e) a flow rate ratio ($I_{21}/I_2$) from 110 to 600; and (f) from 7.0 to less than 10.0 wt % of ethylenic-containing chains having MW of from greater than 0 to 10,000 g/mol, based on total weight of the ethylenic-containing components in the bimodal polyethylene composition.

3. The bimodal polyethylene composition of claim 2 characterized by at least one of limitations (a) to (f): (a) the local minimum in the GPC chromatogram in a range of log(MW) 5.0 to 5.5 between the peak representing the HMW polyethylene component and the peak representing the LMW polyethylene component, measured according to the Bimodality Test Method; (b) density from 0.935 to 0.940 g/cm³ measured according to ASTM D792-13 Method B; (c) melt index ($I_2$) from 0.045 to 0.095 g/10 min measured according to ASTM D1238-13 (190° C., 2.16 kg); (d) flow index ($I_{21}$) from 9 to 14 g/10 min; (e) a flow rate ratio ($I_{21}/I_2$) from 150 to 200; and (f) from 8.0 to 9.5 wt % of ethylenic-containing chains having MW of from greater than 0 to 10,000 g/mol.

4. The bimodal polyethylene composition of claim 1 further characterized by any one of limitations (h) to (l): (h) no measurable amount of long chain branching per 1,000 carbon atoms (LCB Index), measured according to a LCB Test Method, described herein; (i) a shear thinning index value (SHI, $\eta^*(10)/\eta^*(200)$) of greater than 20, measured according to a Shear Thinning Index Test Method, described herein; (j) a molecular mass dispersity ($M_w/M_n$), $Đ_M$, of the LMW polyethylene component of from 2.5 to 3.5 after deconvoluting the LMW and HMW polyethylene components of the bimodal polyethylene composition according to a Deconvoluting Test Method, described herein; and (k) a $M_w/M_n$ of the HMW polyethylene component from 2.5 to 4.5 measured according to a GPC Test Method after deconvoluting the LMW and HMW polyethylene components of the bimodal polyethylene composition according to the Deconvoluting Test Method; (l) each of (i), (j), and (k).

5. The bimodal polyethylene composition of claim 1 further characterized by at least one of limitations (i) to (iii): (i) a PENT test value of greater than 1000 hours measured at 90° C. and 2.4 megapascals (MPa) according to a PENT Test Method, described herein; and a Pipe Hydrostatic test value of greater than 1000 hours measured at 90° C. and 4.0 MPa according to a Pipe Hydrostatic Test Method 2, described herein.

6. The bimodal polyethylene composition of claim 1, wherein the ($C_3$-$C_{20}$)alpha-olefin-derived comonomeric units are any one of limitations (i) to (vii): (i) ($C_3$-$C_{10}$)alpha-olefin-derived comonomeric units; (ii) ($C_4$-$C_{10}$)alpha-olefin-derived comonomeric units; (iii) ($C_4$-$C_8$)alpha-olefin-derived comonomeric units; (iv) 1-butene-derived comonomeric units; (v) 1-hexene-derived comonomeric units; (vi) 1-octene-derived comonomeric units; and (vii) a combination of any two of (iv) to (vi).

7. A bimodal polyethylene composition of claim 1 made by copolymerizing ethylene (monomer) and at least one ($C_3$-$C_{20}$)alpha-olefin (comonomer) with a mixture of a bimodal catalyst system and a trim solution in the presence of molecular hydrogen gas ($H_2$) and an induced condensing agent (ICA) in one, two or more polymerization reactors under copolymerizing conditions; wherein prior to being mixed together the trim solution consists essentially of a (tetramethylcyclopentadienyl)(n-propylcyclopentadienyl)zirconium complex and an inert liquid solvent and the bimodal catalyst system consists essentially of an activator species, a bis(2-pentamethylphenylamido)ethyl)amine zirconium complex and a (tetramethylcyclopentadienyl)(n-propylcyclopentadienyl)zirconium complex, all disposed on a solid support; and wherein the copolymerizing conditions comprise a reaction temperature from 85° to 105° C.; a molar ratio of the molecular hydrogen gas to the ethylene (H2/C2 molar ratio) from 0.0007 to 0.010; and a molar ratio of the comonomer to the ethylene (comonomer/C2 molar ratio) from 0.0005 to 0.02.

8. A method of making a bimodal polyethylene composition of claim 1, the method comprising contacting ethylene (monomer) and at least one ($C_3$-$C_{20}$)alpha-olefin (comonomer) with a mixture of a bimodal catalyst system and a trim solution in the presence of molecular hydrogen gas ($H_2$) and an induced condensing agent (ICA) in one, two or more polymerization reactors under copolymerizing conditions, thereby making the bimodal polyethylene composition; wherein prior to being mixed together the trim solution consists essentially of a (tetramethylcyclopentadienyl)(n-propylcyclopentadienyl)zirconium complex and an inert liquid solvent and the bimodal catalyst system consists essentially of an activator species, a non-metallocene Group 4 metal complex, and a metallocene Group 4 metal complex, all disposed on a solid support; and wherein the copolymerizing conditions comprise a reaction temperature from 85° to 105° C.; a molar ratio of the molecular hydrogen gas to the ethylene (H2/C2 molar ratio) from 0.0007 to 0.010; and a molar ratio of the comonomer to the ethylene (comonomer/C2 molar ratio) from 0.0005 to 0.02.

9. The bimodal polyethylene composition of claim 7 wherein the bimodal polyethylene composition is of any one of limitations (i) to (vi): (i) wherein the bimodal catalyst system consists essentially of a bis(2-pentamethylphenylamido)ethyl)amine zirconium complex and a (tetramethylcyclopentadienyl)(n-propylcyclopentadienyl)zirconium complex in a molar ratio thereof from 1.0:1.0 to 5.0:1.0 and a methylaluminoxane species, all disposed by spray-drying onto the solid support; (ii) wherein the bimodal catalyst system further consists essentially of mineral oil and the solid support is a hydrophobic fumed silica; (iii) wherein the mixture is a suspension of the bimodal catalyst system in mineral oil and the trim solution and wherein the mixture is premade and then fed into the one, two or more polymerization reactors; (iv) wherein the trim solution is made by dissolving (tetramethylcyclopentadienyl)(n-propylcyclopentadienyl)zirconium dimethyl in the inert liquid solvent to give the trim solution; (v) wherein the one, two or more polymerization reactors is one fluidized bed gas phase reactor and the method is a gas phase polymerization; and (vi) each of (i) to (v).

10. A manufactured article comprising a shaped form of the bimodal polyethylene composition of claim 1.

11. The manufactured article of claim 10 wherein the manufactured article is selected from the group consisting of: pipes, films, sheets, extruded articles, and injection molded articles.

12. A pipe composed of the bimodal polyethylene composition of claim 1 and defining an interior volumetric space through which a substance may be transported.

13. A method of transporting a substance, the method comprising moving a substance through the interior volumetric space of the pipe of claim 12.

* * * * *